(12) United States Patent
Foster et al.

(10) Patent No.: US 11,372,519 B2
(45) Date of Patent: Jun. 28, 2022

(54) REALITY CAPTURE GRAPHICAL USER INTERFACE

(71) Applicant: Autodesk, Inc., San Rafael, CA (US)

(72) Inventors: Mason J. Foster, Walnut Creek, CA (US); Damian Paul Stephen Willcox, Alberta (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 17/114,138

(22) Filed: Dec. 7, 2020

(65) Prior Publication Data

US 2021/0089191 A1 Mar. 25, 2021

Related U.S. Application Data

(62) Division of application No. 14/808,995, filed on Jul. 24, 2015, now Pat. No. 10,860,167.

(60) Provisional application No. 62/030,495, filed on Jul. 29, 2014.

(51) Int. Cl.
| | |
|---|---|
| *G06F 3/048* | (2013.01) |
| *G06F 3/04815* | (2022.01) |
| *G06F 3/04845* | (2022.01) |
| *G06F 3/04886* | (2022.01) |

(52) U.S. Cl.
CPC ...... *G06F 3/04815* (2013.01); *G06F 3/04845* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 6,326,978 B1 | 12/2001 | Robbins | |
| 2007/0110338 A1* | 5/2007 | Snavely | G06K 9/00697 382/305 |
| 2008/0276162 A1 | 11/2008 | Birdwell et al. | |
| 2008/0313565 A1 | 12/2008 | Albertson | |
| 2010/0011309 A1 | 1/2010 | Mitra et al. | |
| 2010/0097338 A1 | 4/2010 | Miyashita et al. | |
| 2012/0044247 A1* | 2/2012 | Naimark | G06T 15/205 345/419 |
| 2012/0120054 A1* | 5/2012 | Sandrew | H04N 13/266 345/419 |
| 2013/0055126 A1 | 2/2013 | Jackson et al. | |

(Continued)

*Primary Examiner* — William C Trapanese
(74) *Attorney, Agent, or Firm* — Gates & Cooper LLP

(57) ABSTRACT

A method, system, apparatus, and article of manufacture provide the ability to perform multiple actions based on a reality captured image. An adjustable splitter splits a viewport into viewing panes with the ability to freely adjust the splitter angle. A sphere represents a view of a scene from a viewpoint and used to render an interactive preview of the view without moving to the viewpoint. A series of 2D images may be used to simulate the navigation of a 3D model in an expedited manner. A 3D mesh error scroll bar is used navigate unsorted errors resulting from mesh creation. An interactive gradient map can be used to select a points based on a range of values for non-geometric parameters. An irregularly shaped mesh selection boundary can be directly modified by stretching. An elevation slice of a 3D model can be defined and isolated for viewing/manipulation.

18 Claims, 23 Drawing Sheets

(56) References Cited

U.S. PATENT DOCUMENTS

2013/0218530 A1* 8/2013 Deichmann ............. G06F 30/00
703/1
2014/0002440 A1* 1/2014 Lynch .................... G06T 19/00
345/419

* cited by examiner

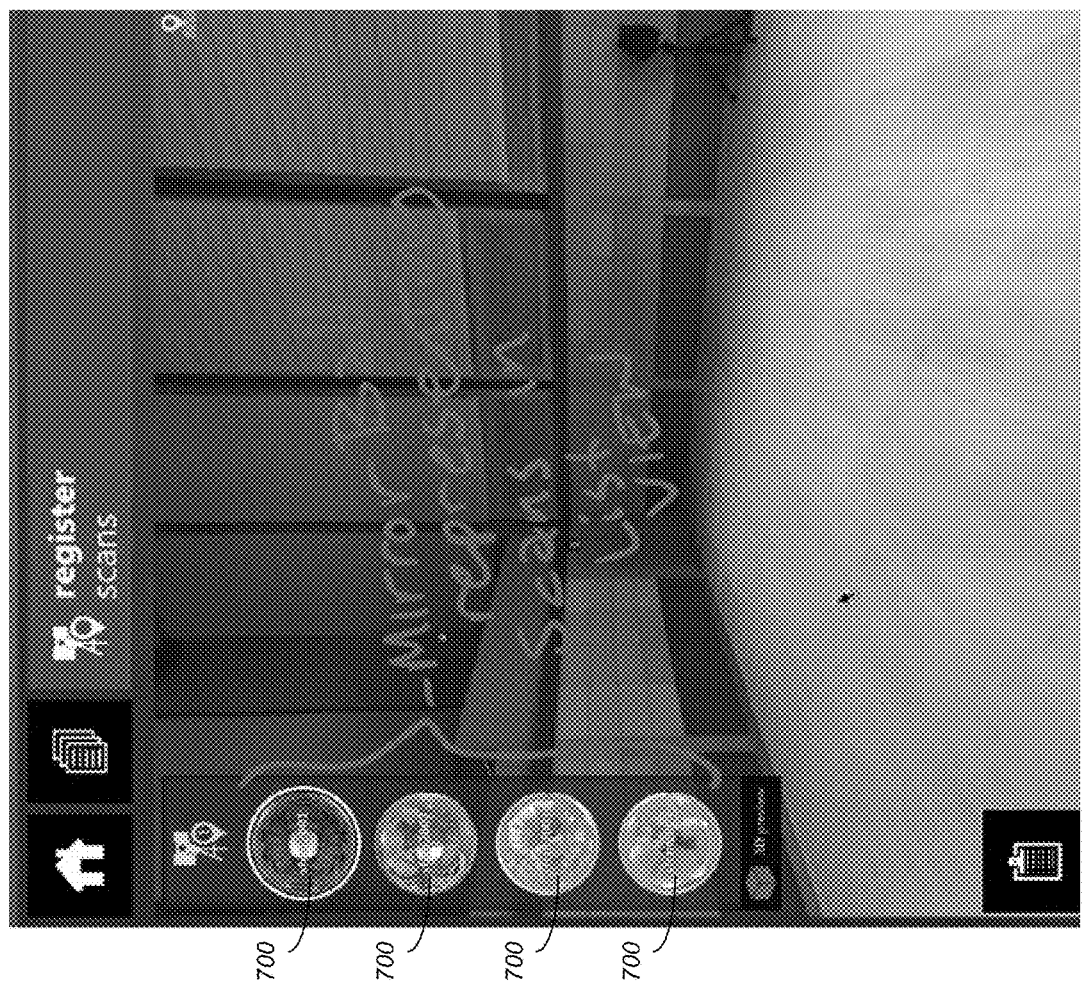
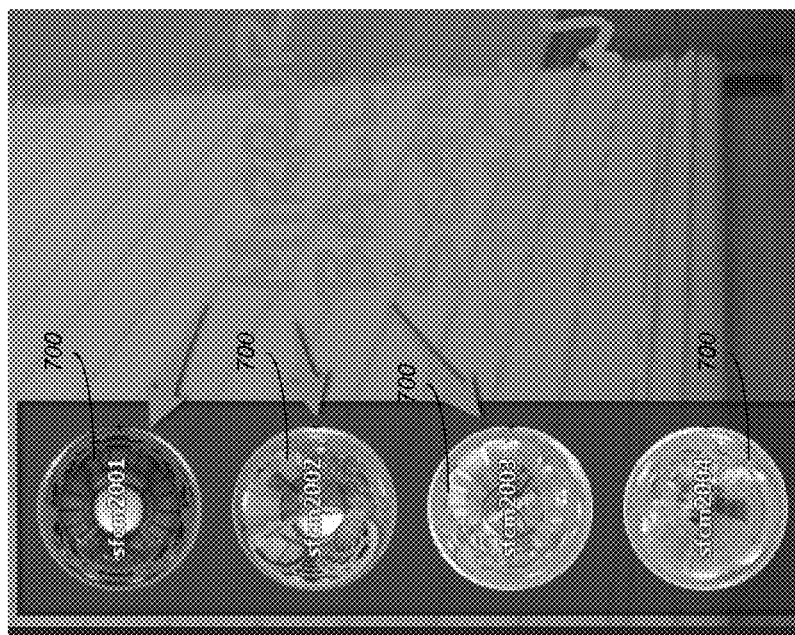
FIG. 7A
FIG. 7B

REALITY CAPTURE GRAPHICAL USER INTERFACE

CROSS-REFERENCE TO RELATED APPLICATIONS

This application is a divisional application of U.S. patent application Ser. No. 14/808,995, filed on Jul. 24, 2015, which issued Dec. 8, 2020 as U.S. Pat. No. 10,860,167 with inventor(s) Mason J. Foster and Damian Paul Stephen Willcox, entitled "Reality Capture Graphical User Interface," which application is hereby incorporated by reference herein, and which application claims the benefit under 35 U.S.C. Section 119(e) of U.S. Provisional Patent Application Ser. No. 62/030,495, filed on Jul. 29, 2014, by Mason J. Foster and Damian Paul Stephen Willcox, entitled "Reality Capture Graphical User Interface," which is incorporated by reference herein.

BACKGROUND OF THE INVENTION

1. Field of the Invention

The present invention relates generally to graphical user interfaces used to display, edit, manipulate, create, and work with reality capture based information (e.g., point cloud data or other data acquired via a variety of scanners).

2. Description of the Related Art

To work with and manipulate real world scenes, laser scanners (e.g., three-dimensional [3D] laser scanners) or other mechanisms (e.g., satellite images, pictures, etc.) capable of capturing images of such real world scenes may be utilized. Once scanned, the result may be a point cloud data set or other images that can often times consume significant memory. Further, viewing, manipulation, and working with reality capture data may be cumbersome, inefficient, and slow. Accordingly, what is needed are graphical user interface widgets/systems that enable users to easily, efficiently, quickly, and functionally perform a variety of tasks with respect to reality capture based data.

SUMMARY OF THE INVENTION

Embodiments of the invention provide methods, systems, apparatus, articles of manufacture, and computer program products for viewing, selecting, manipulating, and working with reality capture based information.

An adjustable splitter provides the ability to split a view of a scene at an angle while enabling the user with the ability to adjust the angle and location of the split in a customized manner.

A mirror ball representation of a scene provides a transparent ball at user specified locations within a scene such that, upon hovering over such a mirror ball, a preview of the scene from the location of the ball may be viewed without requiring the user to actually move to that location within the scene.

Linked two-dimensional (2D)/3D viewports provide a link between two viewports that display a view of a scene in 2D and 3D such that movement/manipulation in one viewport will automatically update the other viewport.

A mesh repair navigation widget provides an easy to use widget for navigating errors identified in the reality capture data set, along with selectable option for repairing such errors.

An interactive gradient ramp enables the assignment of color within a gradient map to a parameter/variable of data within a scene. Ranges within the gradient map may be easily selected thereby selecting the corresponding parameters/variables within the range for viewing/editing/manipulation.

A refined/adjustable boundary selection tool provides the ability to drag the boundary of a mesh selection to increase/decrease the size of the selection.

A 3D elevation slider enables the ability to select an elevation slice of a 3D model and associating such a slice with a book-mark or textual identifier for later use. For example, the user can identify a top and bottom elevation within a 3D model (e.g., defining a floor of a building) that may be isolated for viewing/manipulation.

BRIEF DESCRIPTION OF THE DRAWINGS

Referring now to the drawings in which like reference numbers represent corresponding parts throughout:

FIG. 7A illustrates mirror balls representing different scans in a list view context;

FIG. 7B illustrates a zoomed in view of the mirror ball scan representation of FIG. 7A in accordance with one or more embodiments of the invention;

DETAILED DESCRIPTION OF THE PREFERRED EMBODIMENTS

Figure 1:
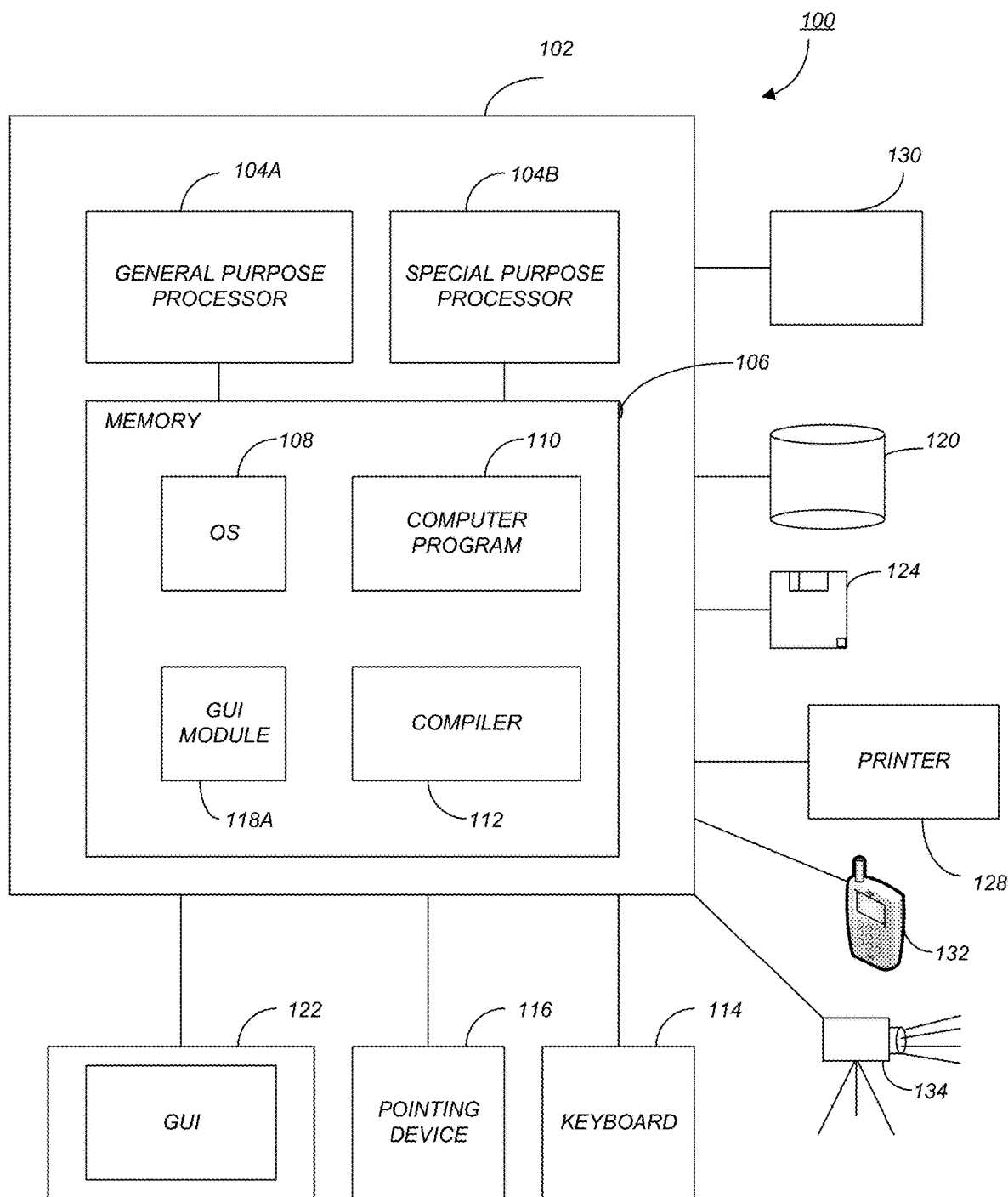
FIG. 1 is an exemplary hardware and software environment 100 used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Hardware Environment FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 may be coupled to, and/or integrated with, a laser scanning device 134. Such a laser scanning device 134 is configured to scan an object or urban environment and obtain a digital representative of such an object/environment in the form of point cloud data that may be processed by the computer 102. Alternatively, laser scanning device 134 may be any device that may be used to acquire data/image information relating to a real-world scene. Data acquired from such a device 134 may be referred to herein as reality capture data. The reality capture data may be processed to create a 3D image, a 3D model, a 2D image, a scene (e.g., a 3D scene), etc.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code.

Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
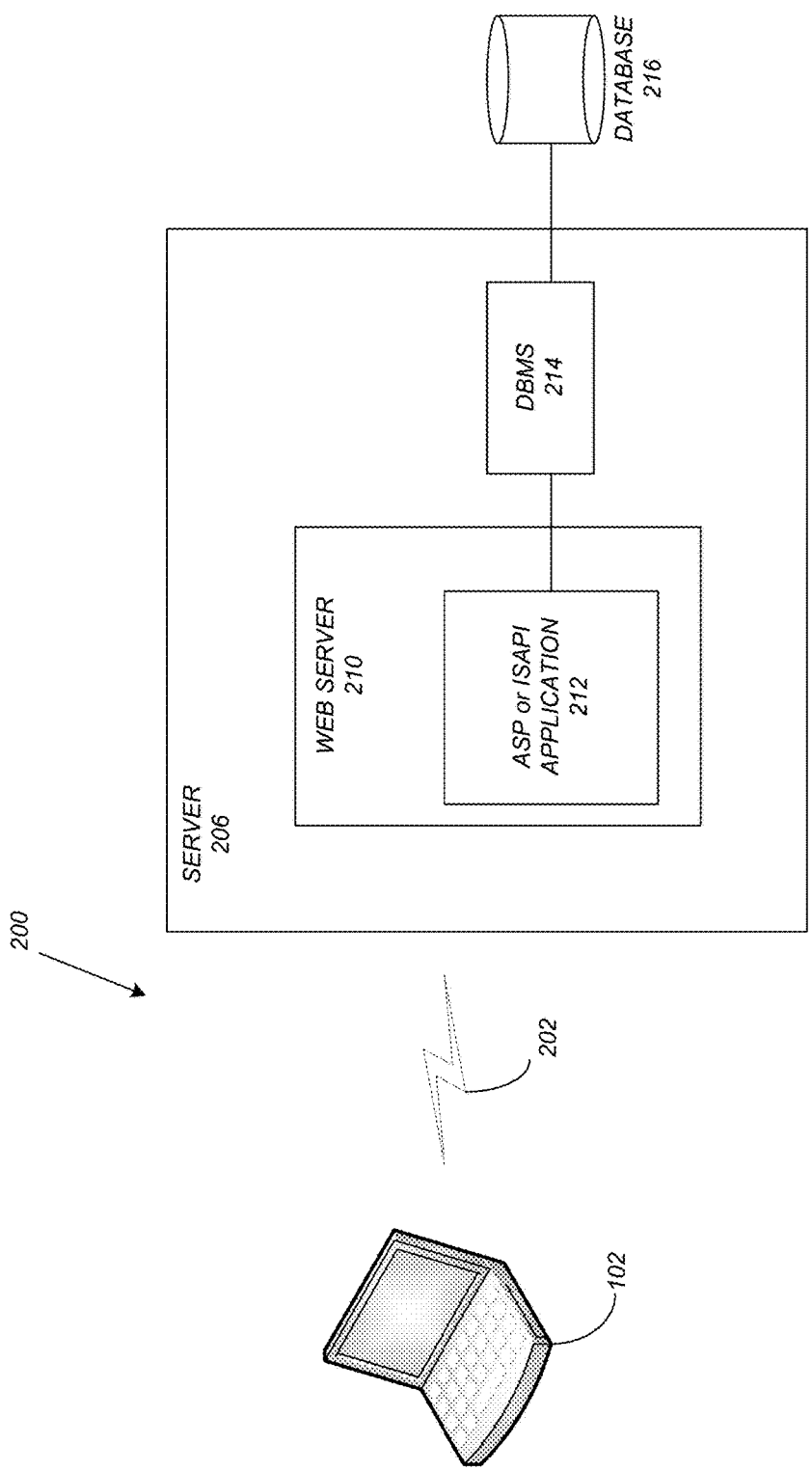
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 102 and servers 206 in accordance with embodiments of the invention.

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 102 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102 and 206.

Computer-Implemented Graphics Program

Figure 3:
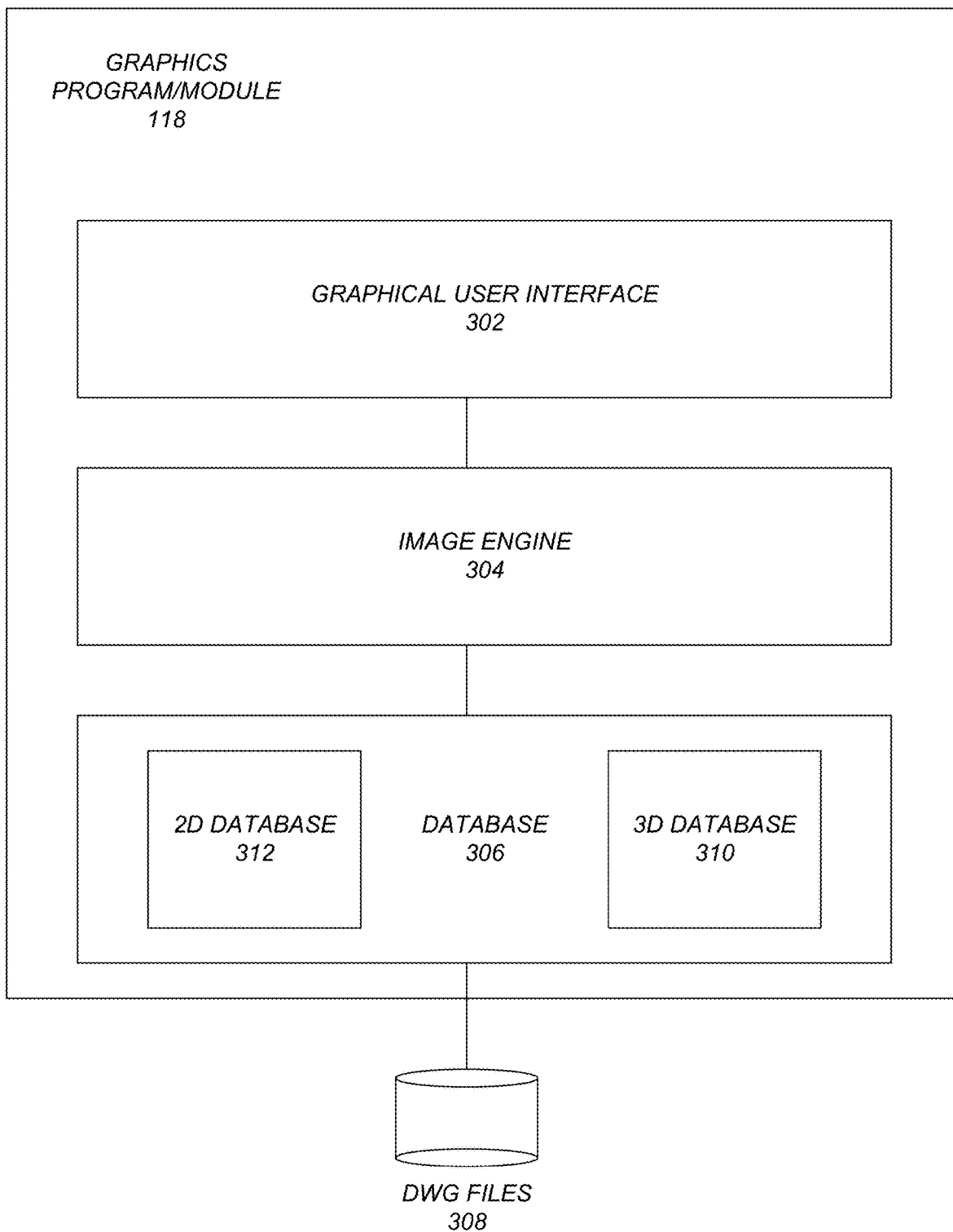
FIG. 3 is a block diagram that illustrates the components of the graphics program (of FIG. 1) in accordance with one or more embodiments of the invention.

FIG. 3 is a block diagram that illustrates the components of the graphics program 118 (of FIG. 1) in accordance with one or more embodiments of the invention. There are three main components to the graphics program 118, including: a Graphical User Interface (GUI) 302, an Image Engine (IME) 304, and a DataBase (DB) 306 (e.g., the database 216 of FIG. 2) for storing objects in Drawing (DWG) files 308.

The Graphical User Interface 302 displays information to the operator and provides the functionality for the operator's interaction with the graphics program 118.

The Image Engine 304 processes the DWG files 308 and delivers the resulting graphics to the monitor 122 for display. In one or more embodiments, the Image Engine 304 provides a complete application programming interface (API)

that allows other computer programs to interface to the graphics program 118 as needed.

The Database 306 is comprised of two separate types of databases: (1) a 3D database 310 known as the "3D world space" that stores 3D information; and (2) one or more 2D databases 312 known as the "2D view ports" that stores 2D information derived from the 3D information.

Adjustable Splitter

Prior art methods for viewing a scene provide for use of a rectangular viewport. Typically, a vertical splitter may be utilized to split a scene. The vertical splitter may be moved left and/or right to shift the size of the different viewports. However, with different models (e.g., 3D models of a scene/objects/etc.), there are often different needs in terms of the screen real estate that is desired. Prior art techniques provide for making one portion of a scene smaller leaving a tall rectangle that doesn't enable the user to view the data in a desirable manner.

Embodiments of the invention provide for an adjustable splitter that may be rotate and positioned in any multi-paned environment thereby providing flexibility to the user to adjust different viewports/panes as desired. In other words, an adjustable splitter allows for splitting a view pane off at an angle that is not completely horizontal or vertical. Such an adjustable splitter is a better use of space for a view of most objects. Further, embodiments of the invention allow for different multiple split, orthogonal views.

Figure 4A:
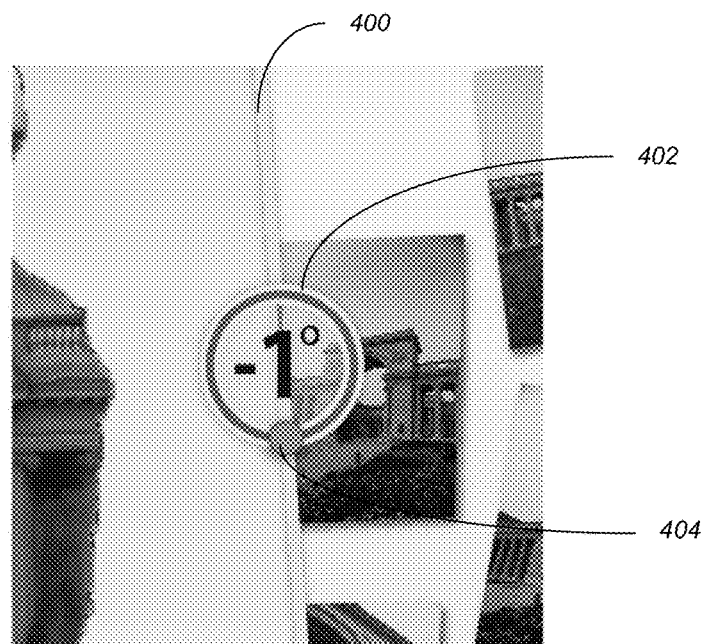
FIGS. 4A and 4B illustrate the adjustable splitter utilized in accordance with one or more embodiments of the invention.
Figure 4B:
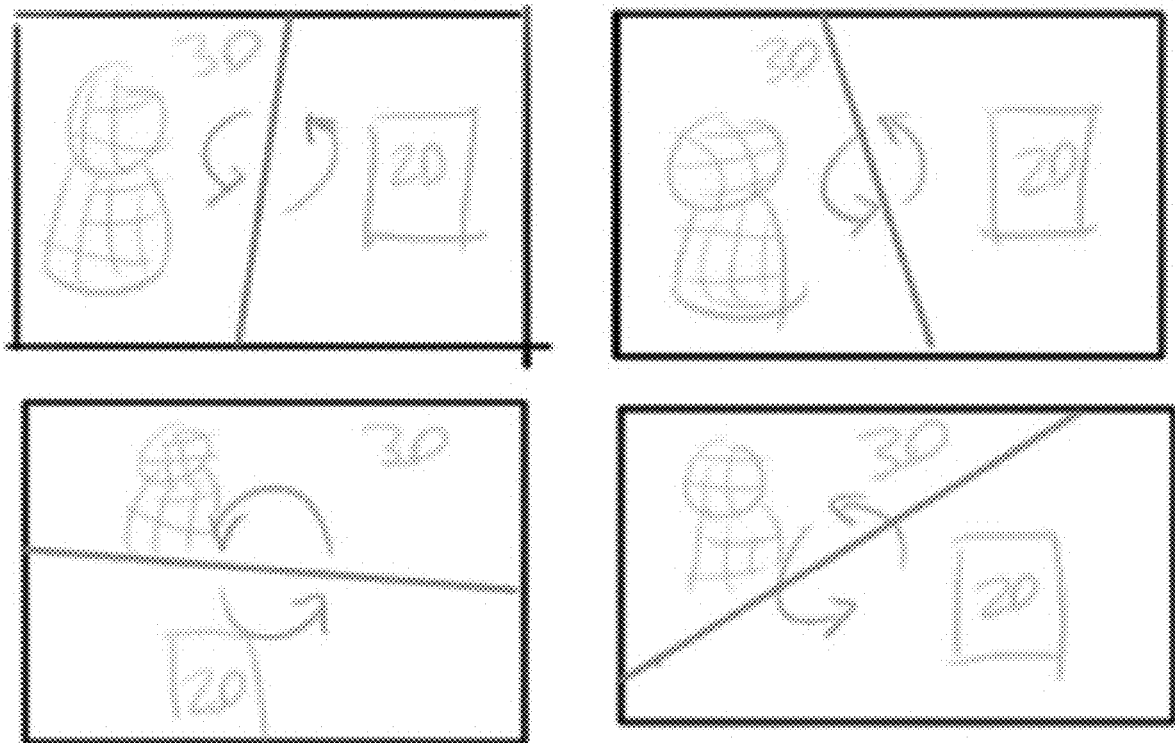

FIGS. 4A and 4B illustrate the adjustable splitter utilized in accordance with one or more embodiments of the invention. In FIG. 4A, as a hint to the ability to change the angle, the default pane/window split 400 may be at a slight angle (e.g., 1 degree). Upon hovering over the split 400, a ball 402 may appear that indicates the degree of the angle (illustrated as −1°). In addition, a grip glyph 404 may enable the ability to change the angle/position of the split 400. In this regard, the user may drag the grip glyph 404 around the circumference of the ball 402 (i.e., in the circle) to adjust the angle of the split 400. Alternatively, upon selecting/activating the ball 402 or based on a keyboard control, the user may have the option of inputting a new angle (e.g., via a keyboard by typing in the desired numerical angle). The user may also have the option to move/position the split 400 (e.g., using a different grip glyph or the same grip glyph 404).

Based on the above, the user has the option of creating interesting and customized splits 400 (e.g., a top corner of the screen can have a small pane) (e.g., allocating screen space at an angle based on a grip glyph 404). Thus, the adjustable splitter provides for optimizing a paned environment for different shapes and models.

FIG. 4B illustrates four different ways to split a paned environment. In particular, FIG. 4B illustrates the ability to freely rotate a split 400 to separate 2D and 3D content panes such that 2D content is displayed in one pane while 3D content is displayed in another pane.

In addition to the ability to customizing a pane using an adjustable splitter, once adjusted, the window pane settings may be saved/associated with a project. Thus, the settings of the split (i.e., the angle and position of the split) along with the data displayed in each pane may be saved with a project with each model. Such settings may also be on a per user basis such that one user can view a horizontal pane split while others may have a 25° angle split.

Figure 5:
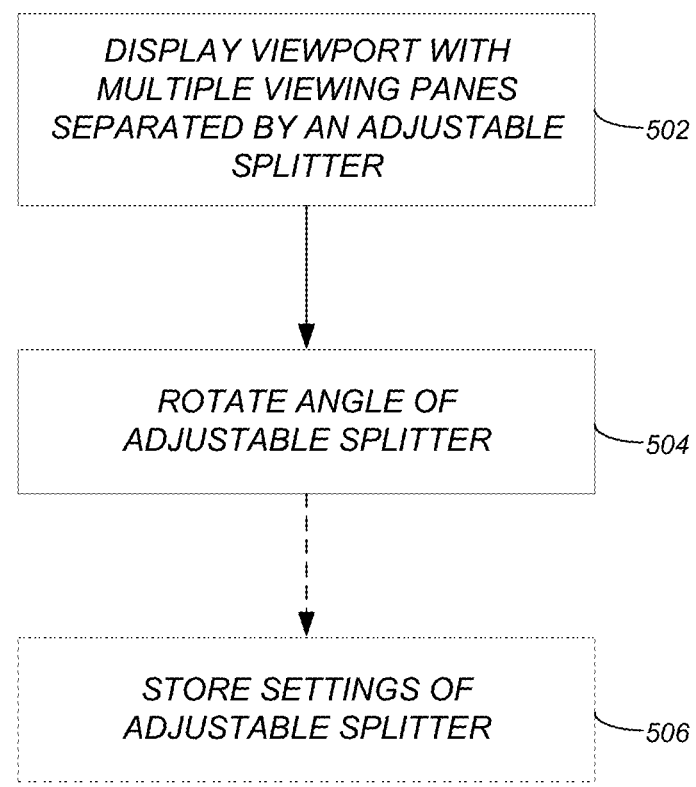
FIG. 5 illustrates the logical flow for providing an adjustable splitter in accordance with one or more embodiments of the invention.

FIG. 5 illustrates the logical flow for providing an adjustable splitter in accordance with one or more embodiments of the invention.

At step 502, a viewport having multiple viewing panes is displayed. The multiple viewing panes are separated by an adjustable splitter that extends from a first edge of the viewport to a second edge of the viewport (e.g., a line across the viewport thereby creating the multiple viewing panes). A default angle of the adjustable splitter may consist of an angle that visually appears other than completely horizontal or completely vertical.

At step 504, an angle of the adjustable splitter is rotated while continuing to extend the adjustable splitter to edges of the viewport. The rotating changes geometric angles that define a geometric shape of the multiple viewing panes. The rotating may include displaying a circular glyph coincident with the adjustable splitter (that includes an indication of the angle, e.g., as illustrated in FIG. 4A), and displaying a grip glyph coincident with the circular glyph. In such an embodiment, dragging the grip glyph around the circular glyph modifies the angle of the adjustable splitter.

Optional step 506 provides the ability to display different views of a model in the multiple viewing panes, and storing settings of the adjustable splitter with a project for the model.

Mirror Ball Representation

A reality capture scene may consist of a collection of different scans from different locations. Embodiments of the invention emulate/reflect a location of each of the different scans using a sphere (also referred to as a spherical environment map or mirror ball). A map of the environment may be drawn/mapped onto the sphere so that the viewer may see what the scene looks like (i.e., the environment around the sphere) from the sphere. In other words, the sphere may be painted with a texture map that consists of the surrounding area. By clicking on the sphere, the user may be transported to the location of the sphere (i.e., to the x,y,z coordinates of the sphere within the 3D scene). Alternatively, by hovering over the sphere, a preview of the location may be displayed. Such a preview enables the user to view around corners, a hallway, etc. within a 3D scene. Stated in other words, the sphere itself may be viewed as a reflection map of the scene from the vantage point/location of the sphere. Accordingly, the preview may comprise an interactive panorama that consists of an unwrapped reflection map so that the user can look around as desired without actually moving to the location of the sphere within the scene.

In view of the above, embodiments of the invention provide a sphere that enables the ability to preview a different area of a scene. The appearance of the ball may be transparent, reflective, a mirror reflection of a particular scene (i.e., a viewpoint from a particular location in a 3D scene)(e.g., a spherical environment map), etc. In this regard, some embodiments provide a 3D sphere rendered with scan information.

Figure 6:
FIG. 6 illustrates a mirror ball in a map view context in accordance with one or more embodiments of the invention.

FIG. 6 illustrates a mirror ball in a map view context in accordance with one or more embodiments of the invention. As illustrated, within a map 600 (e.g., a schematic of a scene/building), the sphere 602 indicates the location of the scan within the map.

FIG. 7A illustrates mirror balls representing different scans in a list view context. In other words, the different scan locations are represented by different spheres/mirror balls that are presented in a list within a menu allowing a selection of the different scans/spheres. FIG. 7B illustrates a zoomed in view of the mirror ball scan representation of FIG. 7A in accordance with one or more embodiments of the invention. As illustrated, each mirror ball 700 represents a different scan/scan location. A fish-eye type view of the scan contents may be painted onto the sphere.

Figure 8:
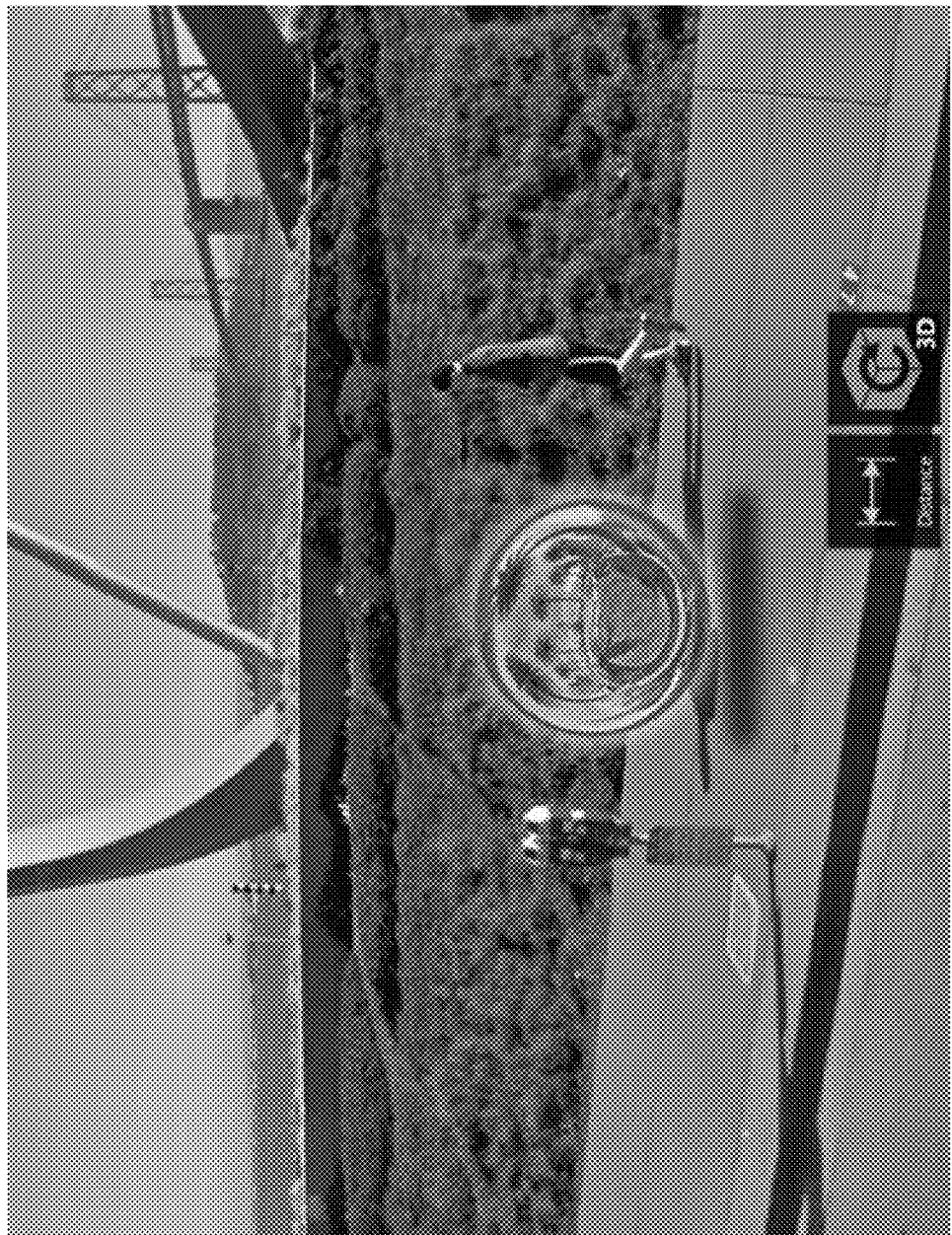
FIG. 8 illustrates a mirror ball shown in a 3D environment at a scan location in accordance with one or more embodiments of the invention.

FIG. 8 illustrates a mirror ball shown in a 3D environment at a scan location in accordance with one or more embodiments of the invention. Thus, when viewing a scan/image of a 3D scene, different mirror balls such as that illustrated in FIG. 8 may be displayed throughout the scene to identify the different scan locations and/or the locations where a different view of the scene may be viewed.

Figure 9:
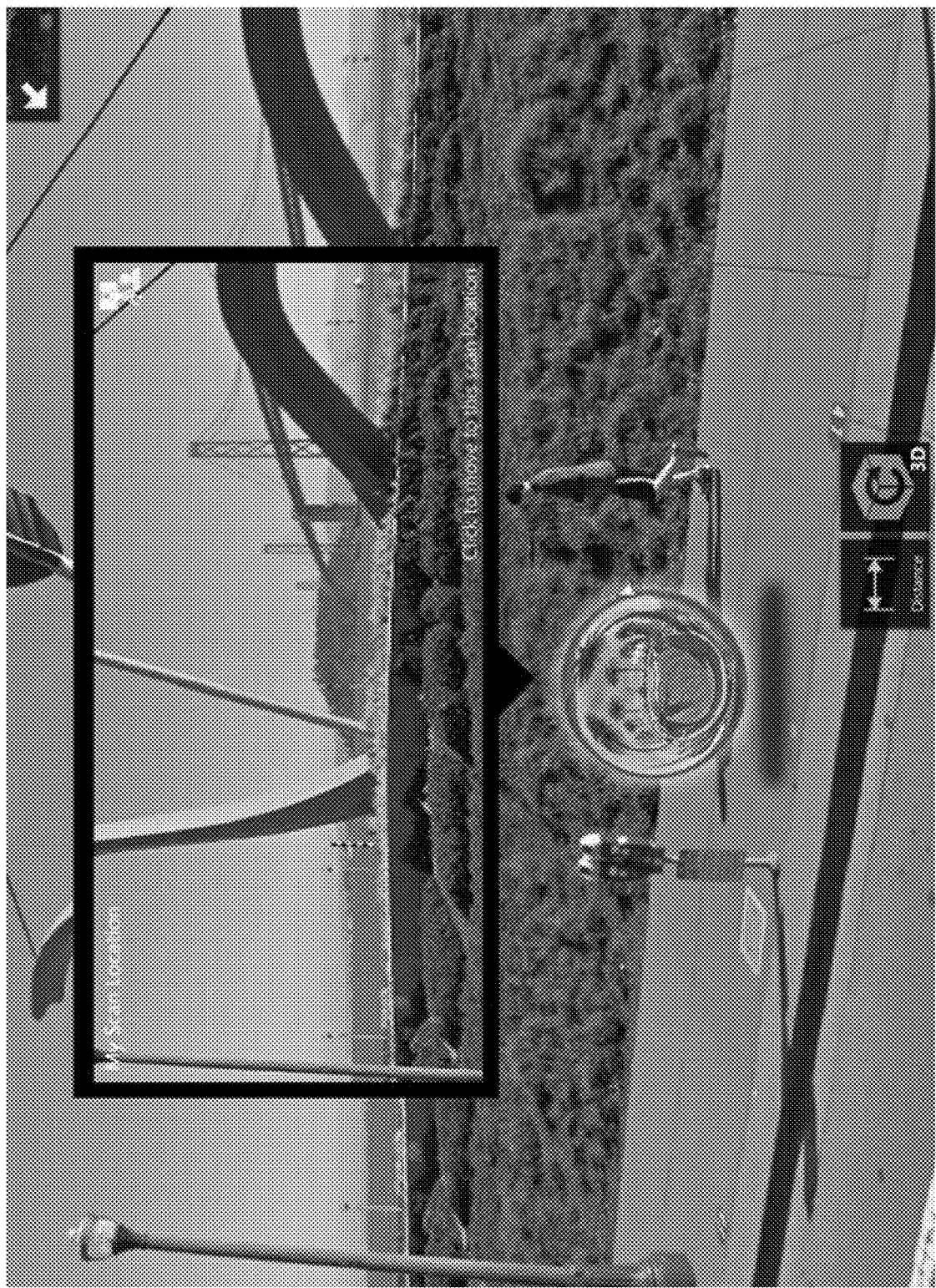
FIG. 9 illustrates the mirror ball shown in the 3D environment of FIG. 8 with the hover action activated in accordance with one or more embodiments of the invention.

FIG. 9 illustrates the mirror ball shown in the 3D environment of FIG. 8 with the hover action activated in accordance with one or more embodiments of the invention. Thus, the user has hovered (e.g., placed a cursor for a defined threshold period of time over a particular location) over the mirror ball in FIG. 9 and an interactive preview window is displayed that illustrates the scan location point of view. The user can click the text "Click to move to this scan location" to transport the user to the location represented by the mirror ball. Alternatively, or in addition, the user may click within the hover window and move the mouse around (e.g., horizontally/vertically/etc.) to view a preview of the scan data from the mirror ball's location/point of view. In FIG. 9, the preview shows the scan that is different from the current location of the user (as can be seen by the double images of the vertical structure viewed inside and outside of the preview window).

Figure 10:
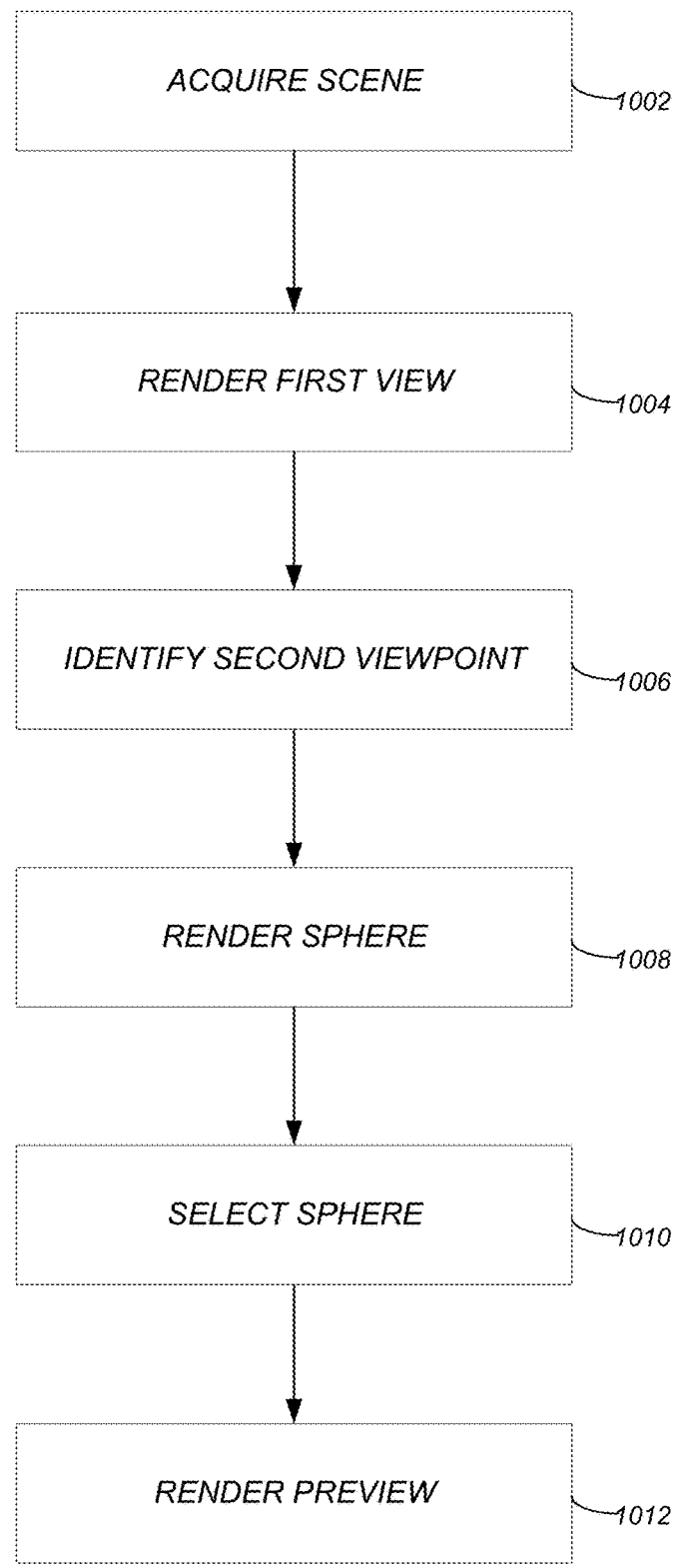
FIG. 10 illustrates the logical flow for navigating a three-dimensional (3D) reality-capture scene.

FIG. 10 illustrates the logical flow for navigating a three-dimensional (3D) reality-capture scene. At step 1002, the 3D reality capture scene is captured. The 3D reality capture scene consists of image data that is created based on scans of a real world scene.

At step 1004, a first view of the 3D reality capture scene is rendered from a first viewpoint.

At step 1006, a second viewpoint (that may consist of one of the scans used to create the 3D reality capture scene) within the 3D reality capture scene is identified.

At step 1008, within the first view, a sphere is associated with and rendered at the second viewpoint. The sphere is rendered by painting a texture map, of the 3D reality capture scene, from the second viewpoint onto the sphere.

At step 1010, the sphere is selected (e.g., by hovering [a cursor] over the sphere).

At step 1012, in response to the sphere selection, an interactive preview window (e.g., an interactive panorama/unwrapped reflection map) of the 3D reality capture scene is rendered from the second viewpoint without actually moving (the user/viewpoint) to the second viewpoint. Thereafter, based on the interactive preview window, an option to move to the second viewpoint may be selected. In response to such a selection, the 3D reality capture scene may be rendered/re-rendered from a second view that is based on the second viewpoint.

Linked 2D/3D Viewports (Aka Bidirectional Viewport Link)

Embodiments of the invention link two viewing panes/viewports, one pane showing multiple 2D images (e.g., that capture different angles/viewpoints of a scene/model), while the other pane shows a 3D constructed model. The real time selection of an item/image/object in one pane affects the view displayed in the other such that both view position/direction, as well as zoom level are synchronized.

With linked viewports, when you orbit within the 3D pane, the image that is displayed in the 2D pane is based on the camera position within the 3D pane. In other words, if looking at the face of an image in the 3D pane, the 2D image that is closest to where the camera image (for the 3D viewport) is selected for display in the 2D pane. Further, based on the linking, if a zoom is performed in the 3D pane and/or the 2D pane, the corresponding image is zoomed in the other pane. For example, if a user zooms in on the nose area within a 3D image, the camera will also zoom in on the corresponding/linked 2D image.

Figures 11A, 11B:
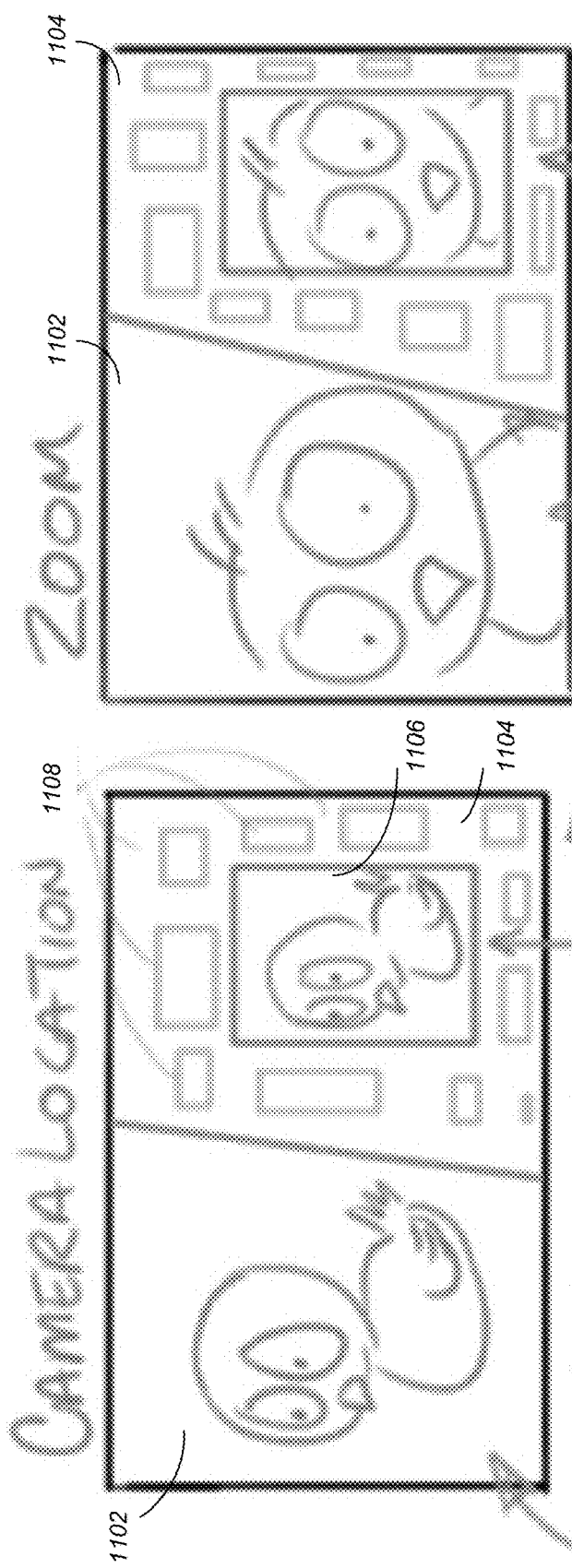
FIGS. 11A and 11B illustrate the concept of linking a 2D and 3D viewport and zooming in accordance with one or more embodiments of the invention.

FIGS. 11A and 11B illustrate the concept of linking a 2D and 3D viewport and zooming in accordance with one or more embodiments of the invention. In FIGS. 11A and 11B, the left pane 1102 contains the 3D viewport while the right pane 1104 contains the 2D viewport. In FIG. 11A, when navigating, the 3D model will update the photo shown 1106 (in pane 1104) (i.e., based on the camera location) and vice versa. In other words, the particular photograph/2D image selected 1106 (from the available photos 1108) is based on the photo 1108 that is nearest to the viewpoint of the 3D viewport 1102. In FIG. 11B, zooming in on either the 3D pane 1102 or 2D pane 1104 will also zoom the other pane in synchronization (i.e., dynamically in real time).

To enable the linking between 2D 1102 and 3D viewports/panes 1104, the location (within 3D space) where each 2D image 1108 is captured (i.e., the (x,y,z) coordinates) is identified. Accordingly, every photograph/2D image 1108 has a 3D location in 3D space. When orbiting/rotating the image in the 3D viewport 1102, a determination is made regarding where the 3D viewport camera is located. Thereafter, the nearest 2D image 1108 to that location is determined and utilized for the display 1106 (in the 2D viewport) (because it has the most similar perspective on the model). As used herein, "nearest" may be based on the distance and angle (e.g., the lowest root mean square between of the angle/closest camera location). Accordingly, navigating within the 3D viewport 1102 of the model will update the photograph 1106 that is shown in the 2D viewport 1104 (and vice versa). Similarly, zooming in on either the 3D pane 1102 or 2D pane 1104, will zoom in the other pane (1104/1102 respectively) in synchronization.

Figure 11C:
FIG. 11C illustrates a 3D viewport in the left showing a zoomed in 3D model and the 2D viewport on the right with the nearest 2D photograph selected and zoomed in accordance with one or more embodiments of the invention.

FIG. 11C illustrates a 3D viewport 1102 in the left showing a zoomed in 3D model and the 2D viewport 1104 on the right with the nearest 2D photograph 1108 selected 1106 and zoomed in accordance with one or more embodiments of the invention.

In view of the above, a 2D image 1108 of a model may be utilized and displayed to the user while a 3D model is being generated (e.g., from the 3D photos). In this regard, embodiments of the invention may utilize the various scans or 2D images 1108 to generate a 3D model of a scene/object. For example, particular angles of the model may be generated over time until the model is completely rendered/generated. Instead, of waiting for an entire 3D model to be rendered/generated, the user can view a photograph 1108 of the model from the desired viewpoint.

In addition to the above, 3D navigation may be performed entirely using 2D data/images. In this regard, a 3D object may be browsed in pseudo-3D only using 2D images 1108 of the 3D object. To provide such capability, the positions of the different 2D images 1108 (of the 3D object) are determined/known (e.g., the camera position in 3D space). A mapping may then be generated for each given image that determines the appropriate image to navigate to based upon a navigation operation to the left, right, above, or below the given image 1108. In other words, the system essentially has a photo stack with the ability to orbit a model using 2D images similar to utilizing a "flip book" type animation as the user clicks and drags to navigate in a model.

Figure 11D:
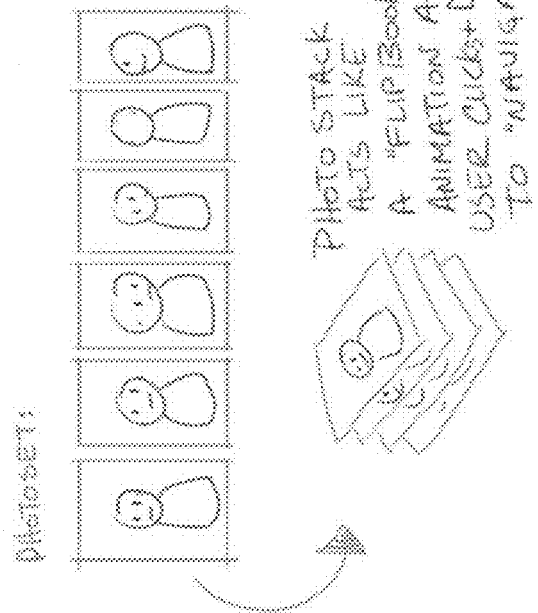
FIG. 11D illustrates a photoset/stack and the orbiting operation that may be conducted in accordance with one or more embodiments of the invention.
Figure 11D:
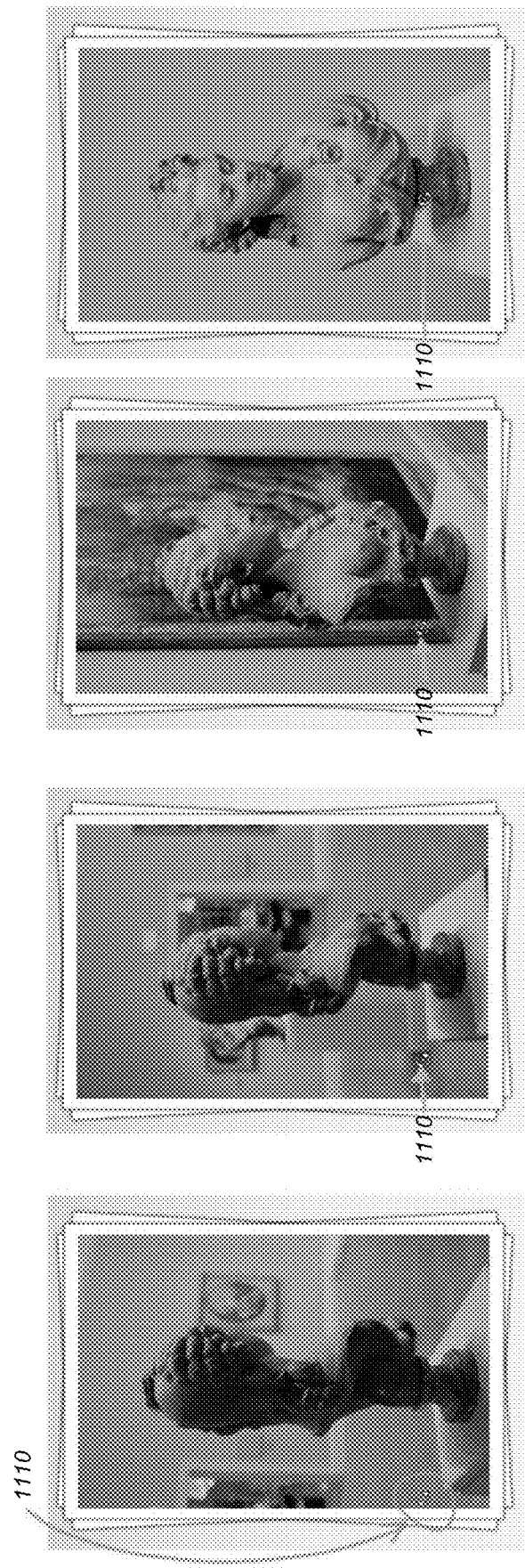

FIG. 11D illustrates a photoset/stack and the orbiting operation that may be conducted in accordance with one or more embodiments of the invention. As illustrated, an orbit cursor 1110 may be displayed. The user clicks on a picture/orbit cursor 1110 and performs a drag operation, thereby causing mages to change and appear to navigate the object one image at a time. Of note is that a 3D model is not being generated. Instead, the user is simply navigating through a series of 2D images 1108 of a 3D object and one image is being shown at a time to emulate/simulate an orbit/rotation operation around the model.

To perform such a 2D simulation of a 3D orbit operation, each image 1108 is associated with a location in 3D space. A triangulation operation may then be performed to identify the different parts in the image 1108 (thereby identifying a 3D position of each pixel in the image). Accordingly, all pixels/images are associated with an (x,y,z) coordinate position in 3D space. The user can then browse based on where the user drags an orbit cursor 1110.

Figure 12:
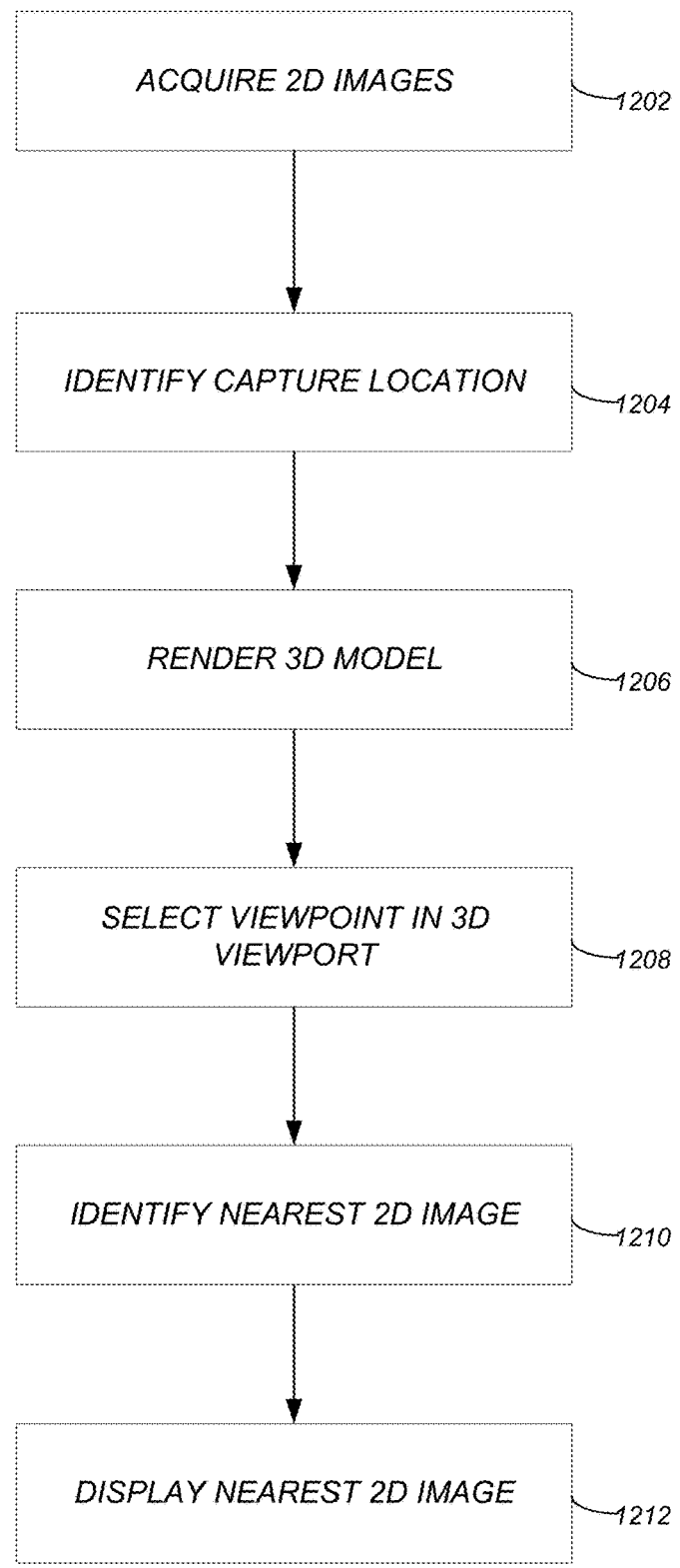
FIG. 12 illustrates the logical flow for viewing a 3D model using 2D images in accordance with one or more embodiments of the invention.

FIG. 12 illustrates the logical flow for viewing a 3D model using 2D images in accordance with one or more embodiments of the invention.

At step 1202, a set of two or more 2D images is acquired.

At step 1204, for each of the two or more 2D images, a capture location within 3D space is identified. Such a capture location corresponds to where the 2D image was captured/taken (i.e., a camera location within 3D space where the 2D image was captured from).

At step 1206, a 3D model is rendered in a 3D viewport.

At step 1208, a viewpoint is selected in the 3D viewport. To selection step may be conducted while orbiting/rotating the 3D model in the 3D viewport. In this regard, the location of a 3D viewport camera (while orbiting) may be determined and used/identified as the viewpoint.

At step 1210, in response to selecting the viewpoint, the 2D image that is nearest to the viewpoint is identified.

At step 1212, the identified 2D image is displayed in a 2D viewport.

Further to the above, the 3D model may be generated based on the 2D images. In such an embodiment, while the 3D model is generating, navigation of the 3D model may be simulated by displaying the two or more 2D images (i.e., rather than the actual 3D model).

Mesh Repair Navigation Widget

Some reality capture applications may attempt to build a mesh (e.g., a 3D model) from photographs (e.g., 2D images). When building such a mesh, often times, small errors may result (e.g., holes, spikes, tunnels, etc.). An analysis of the resulting mesh may be conducted resulting in an identification of the errors. The number of errors may be large (e.g., hundreds to thousands of errors). Often times, there is no particular order or relationship for the errors. Similar to errors, different users may add different notes to a project that are not sorted/ordered in any manner.

Figure 13A:
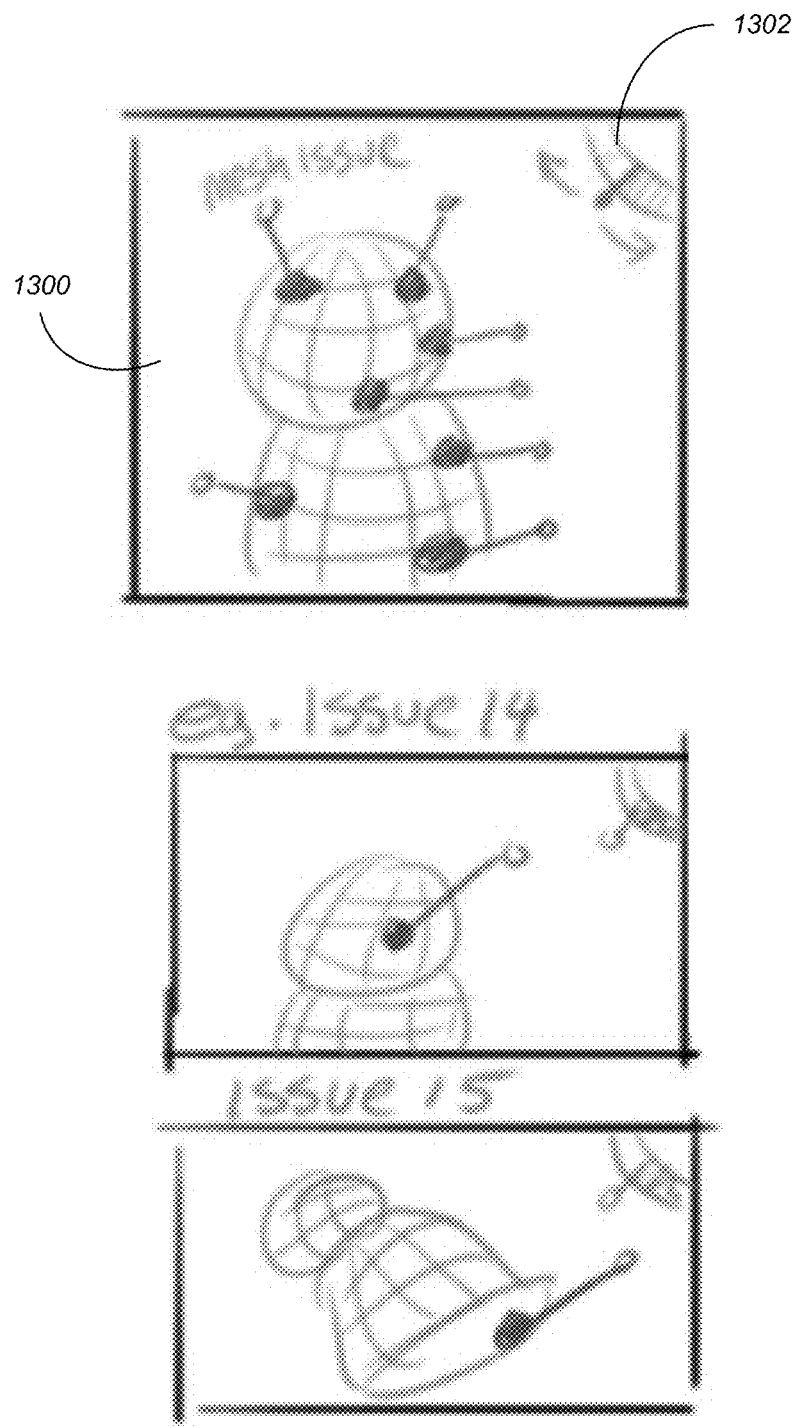
FIG. 13A illustrates a mesh repair navigation widget used in accordance with one or more embodiments of the invention.

Embodiments of the invention provide a methodology and system for browsing/navigating through a large number of items (e.g., errors or notes) without any sorting/order to the items. To navigate/browse through a list of such items a scroll bar or other tool may be used to advance/progress through the list of items while displaying a location for each item. FIG. 13A illustrates a mesh repair navigation widget used in accordance with one or more embodiments of the invention. The user can drag a slider within a scroll bar 1302 to navigate mesh issues in a 3D model. As the slider is moved, the issues are navigated to via camera transitions (within the 3D model viewport 1300). As displayed, when the user slides to issue 14, issue 14 is highlighted/navigated to within viewport 1300. Similarly, the viewport 1300 will navigate to a different orientation when a different issue is selected/scrolled to (e.g., issue 15—as displayed in the bottom image of FIG. 13A).

Figure 13B:
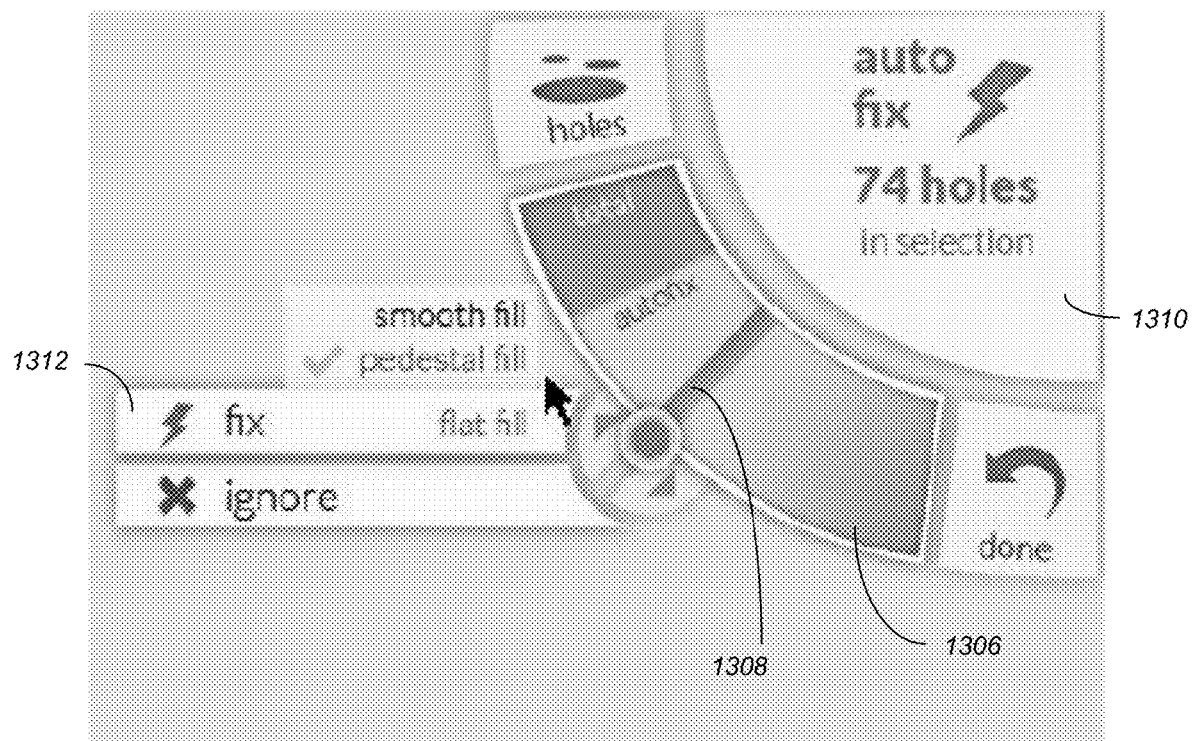
FIG. 13B illustrates an alternative mesh navigation repair widget that may be utilized in accordance with one or more embodiments of the invention.

FIG. 13B illustrates an alternative mesh navigation repair widget that may be utilized in accordance with one or more embodiments of the invention. The scroll bar 1306 has a slider 1308 that may be used to navigate through the list of mesh errors. Out of the total list of errors, 74 holes have been identified and are set to be fixed automatically (as indicated in the text displayed within a pop-up/display area 1310). As shown, once a particular error has been selected (e.g., using the slider), the user has the option of fixing the error (using a smooth fill, pedestal fill, or flat fill), or ignoring the error. The different options for fixing the error may be displayed via a pop-up or dialog window 1312 as the result of a hover operation. Thus, the user can quickly scrub through all items identified as an error, view whichever item(s) desired, and autofix selected errors.

Figure 14:
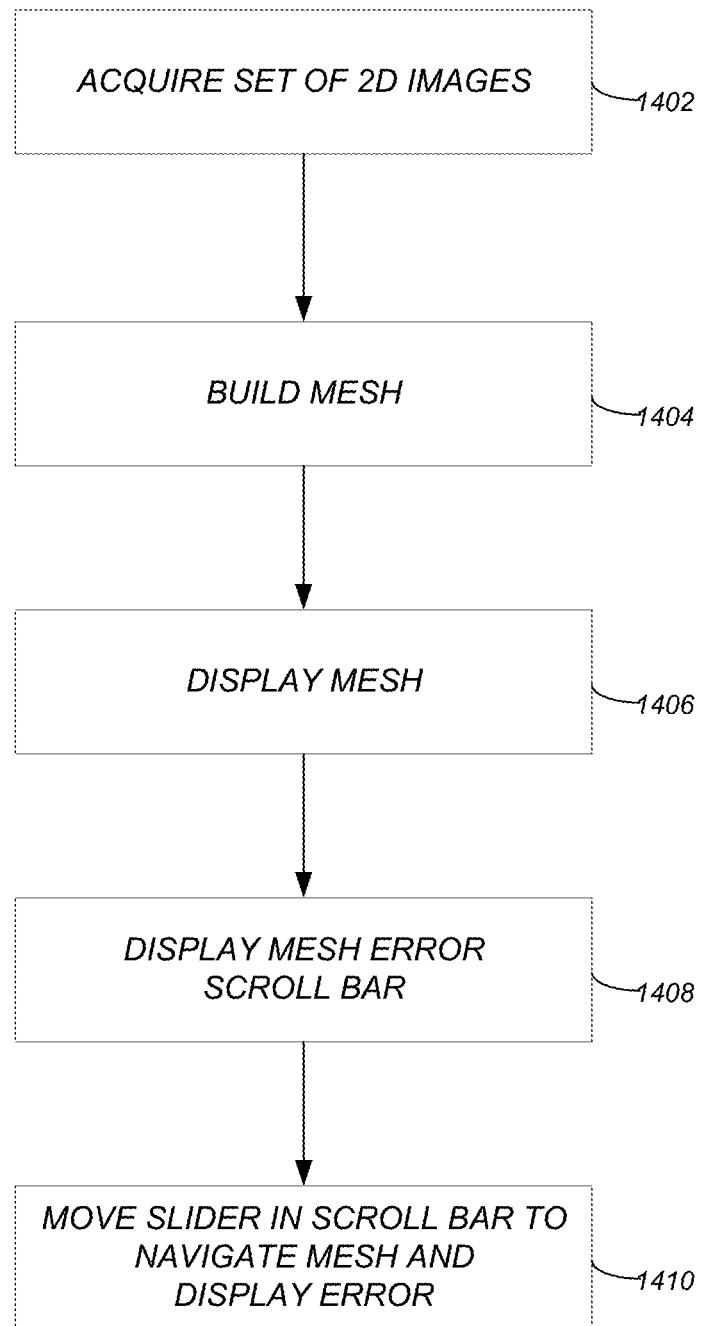
FIG. 14 illustrates the logical flow for navigating mesh errors in a three-dimensional (3D) model in accordance with one or more embodiments of the invention.

FIG. 14 illustrates the logical flow for navigating mesh errors in a three-dimensional (3D) model in accordance with one or more embodiments of the invention.

At step 1402, a set of two or more two dimensional (2D) images is acquired.

At step 1404, a 3D mesh is built based on the set of two or more 2D images. Such a mesh includes multiple errors.

At step 1406, the 3D mesh is displayed.

At step 1408, a mesh error scroll bar is displayed. The mesh error scroll bar represents a list of the multiple errors, and includes a slider that identifies one of the multiple errors from the list.

At step 1410, the slider is moved within the scroll bar to navigate the multiple errors in the mesh, wherein as the slider is moved. As the slider is moved, the mesh is navigated to a different orientation to enable visualization of the error identified by the slider. Further, as the slider is moved, the error identified by the slider is displayed within the mesh in a visually distinguishable manner (e.g., by highlighting, different color, etc.). In addition, once one of the errors is selected (e.g., via hovering over a slider or over the error in the mesh), a selectable option for fixing the selected error is presented/displayed/provided.

Drag to Select Gradient

Figure 15:
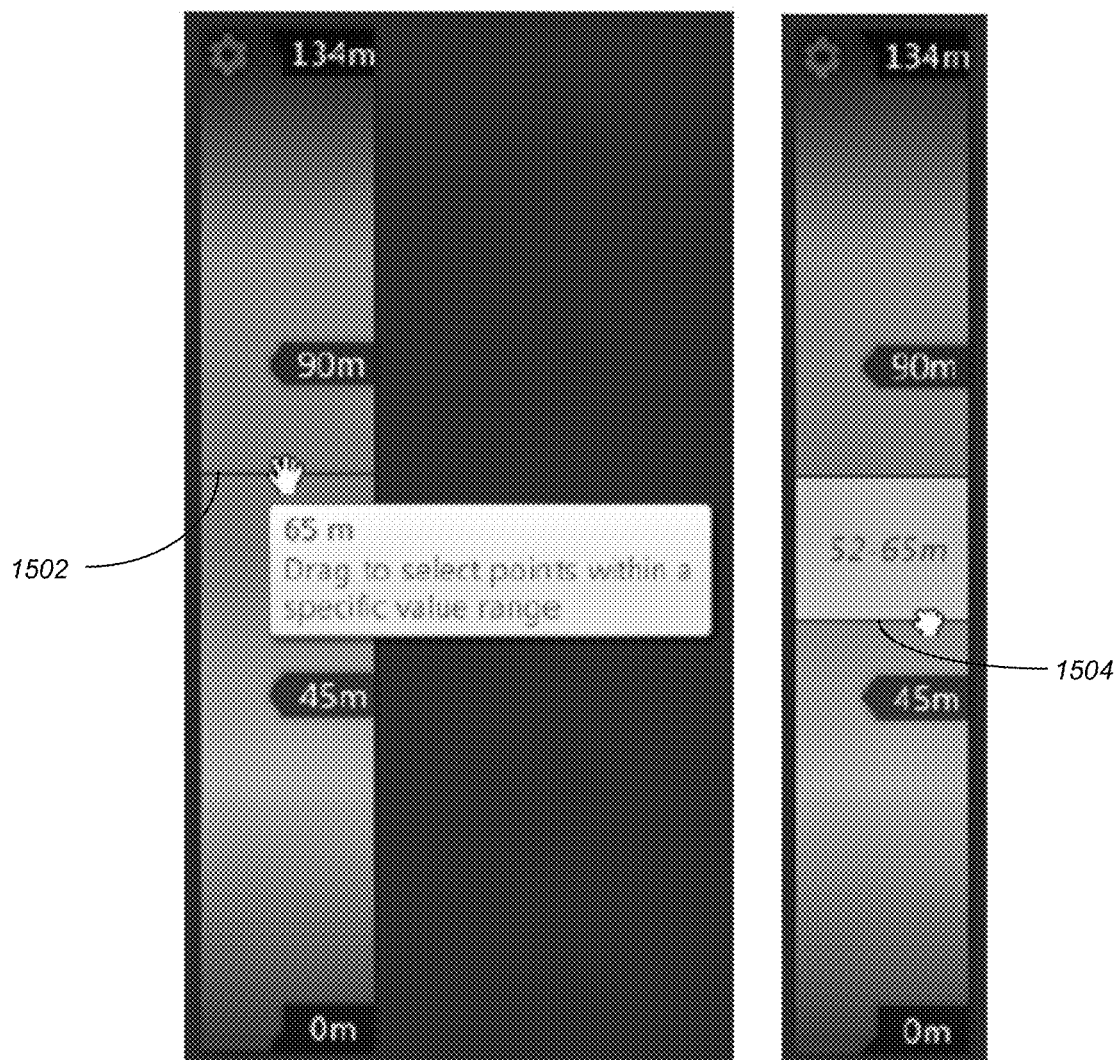
FIG. 15 illustrates an interactive gradient map in accordance with one or more embodiments of the invention.

Embodiments of the invention provide an interactive gradient map where any type of parameter value may be represented by a color within the gradient map and the user can select a range of values thereby selecting points having the selected value. FIG. 15 illustrates an interactive gradient map in accordance with one or more embodiments of the invention. In FIG. 15, the values represent a height/elevation parameter with the color range going from the highest elevation of 134 m in blue to the floor level at 0 meters. However, the color could represent any variable that is part of a 3D scanned image (e.g., elevation, intensity, flatness, confidence [e.g., the level of confidence about the value of a point within a scan—such as based on values from repeated/multiple scans or lower confidence if an error is found], etc.). The user first places an initial sliding bar/line 1502 as the upper bounds for the range selection. The user can then utilize a drag operation to place a second sliding bar/line 1504 to set/define/establish the lower bounds of the range selection. Thus, a horizontal slice of a points from a 3D model are being selected in FIG. 15.

Once a range of points has been selected (based on the identification of the range of values for the parameters), the user can then remove such points (e.g., remove all points within a confident range of 0-20%), or select points for manipulation. In this regard, the interactive gradient map enables a user to select points based on a value that is not geometric in nature (i.e., is not based on a geometric area) but instead is based on data access/values. In other words, the user is selecting actual points from all over a 3D model/scanned images based on a non-geometric based attribute of the points. For example, a user can select a specific value/range for viewing or manipulating (e.g., select all points with elevations between 10-12 m or select all points with an intensity of 35%.

Figure 16:
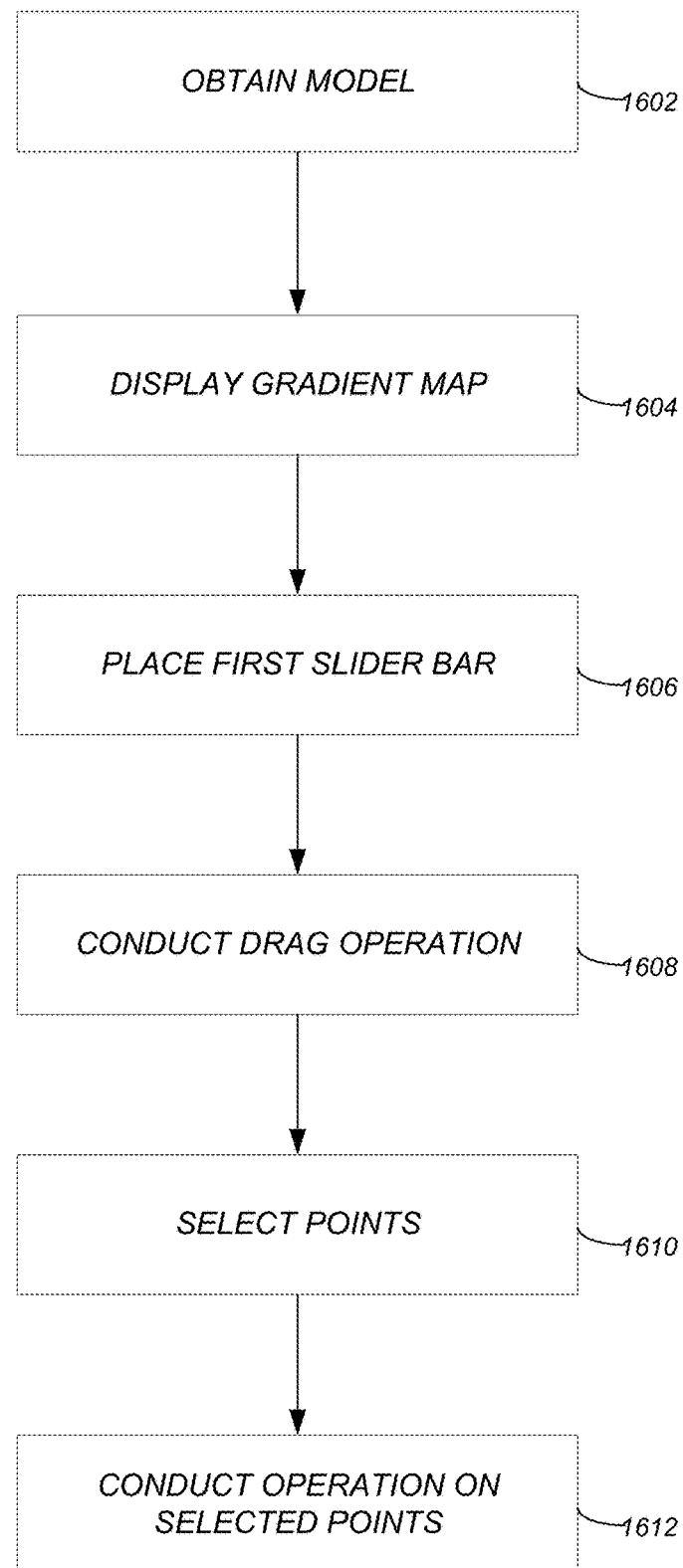
FIG. 16 illustrates the logical flow for selecting points based on a gradient map in accordance with one or more embodiments of the invention.

FIG. 16 illustrates the logical flow for selecting points based on a gradient map in accordance with one or more embodiments of the invention.

At step 1602, a model having one or more points is obtained.

At step 1604, the interactive gradient map is displayed. The interactive gradient map represents a (non-geometric) parameter of the one or more points. In addition, parameter values of the parameter are represented by color within the interactive gradient map.

At step 1606, a first slider bar is placed on the interactive gradient map. The first slider bar indicates a first bound for a range selection.

At step 1608, a drag operation is conducted from the first slider bar. The drag operation creates a second slider bar that indicates a second bound for the range selection. The range selection is a slice of the parameter values.

At step 1610, points having the parameter values within the range selection are selected.

At step 1612, an operation is conducted on the selected points.

Adjustable/Refined Boundary Selection

Embodiments of the invention allow a user to drag the boundary of a mesh selection to increase or decrease the size of the selection. Such capability makes it easy to adjust the size of a selected area that would otherwise only be possible using cumbersome selection methods. To provide such capability, once a mesh area has been selected, rather than using a selection tool, when a user hovers over a selection area, the user may be presented with the option of selecting and dragging the boundary/perimeter itself (e.g., similar to a rubber-band or rope). In contrast to prior art area selection, a user is not adding and/or moving points, nor is the user creating a boundary box/rectangular marquee transform. Instead, a mesh selection area is being directly edited.

Figure 17A:
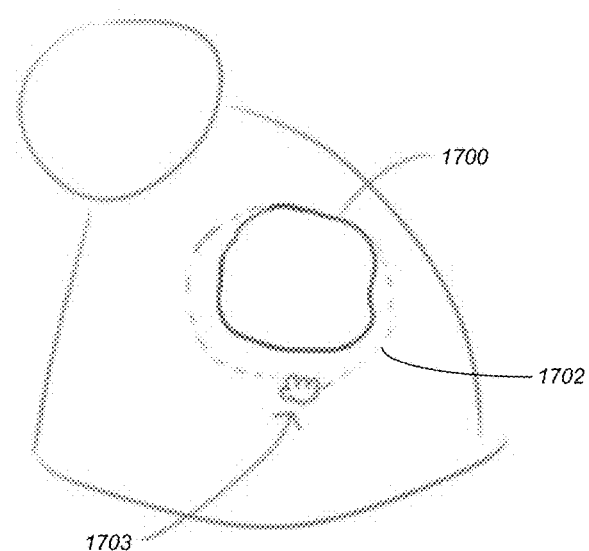
FIG. 17A illustrates an adjustable selection boundary that may be utilized in accordance with one or more embodiments of the invention.

FIG. 17A illustrates an adjustable selection boundary that may be utilized in accordance with one or more embodiments of the invention. To adjust the boundary, the user clicks on a boundary edge and drags 1702 the edge itself. The original selection boundary is illustrated at 1700. The user can drag the selection boundary 1700 to the dotted line 1702 like a "sheet" constrained by pull points on the opposite side. Handle/grip 1703 illustrates the grip that is displayed during a drag operation. Alternatively, the user can resize the selection area in all directions at once. For example, by holding down the shift key while dragging a boundary, the entire selection may be expanded uniformly. Alternatively, without holding the shift key, just the local area may be expanded.

Figures 17B, 17C:
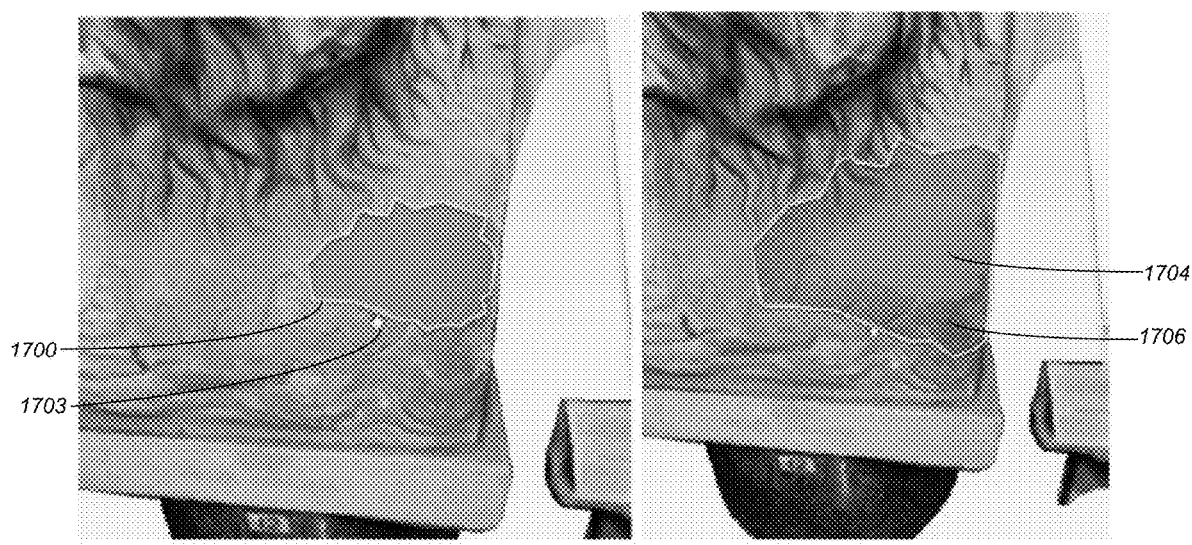
FIGS. 17B-17C illustrate images of a 3D model portraying an adjustable mesh selection boundary in accordance with one or more embodiments of the invention.

FIGS. 17B-17C illustrate images of a 3D model portraying an adjustable mesh selection boundary in accordance with one or more embodiments of the invention. FIG. 17B illustrates an original mesh selection boundary 1700. In FIG. 17A, the user has hovered over an area with a cursor and a handle/grip displays 1703 with a hand for the user to drag the handle/grip 1703 to adjust the boundary selection. FIG. 17C illustrates the result of adjusting the boundary of FIG. 17B in accordance with embodiments of the invention. The original area selected 1704 is distinguishable from the adjusted area 1706 based on color (or other distinguishing feature—e.g., transparency, intensity, brightness, etc.). As illustrated in FIG. 17C, the user has held down the shift key while performing the boundary adjustment, resulting in the expansion of the entire selection boundary 1704 uniformly instead of a localized expansion.

Figure 18:
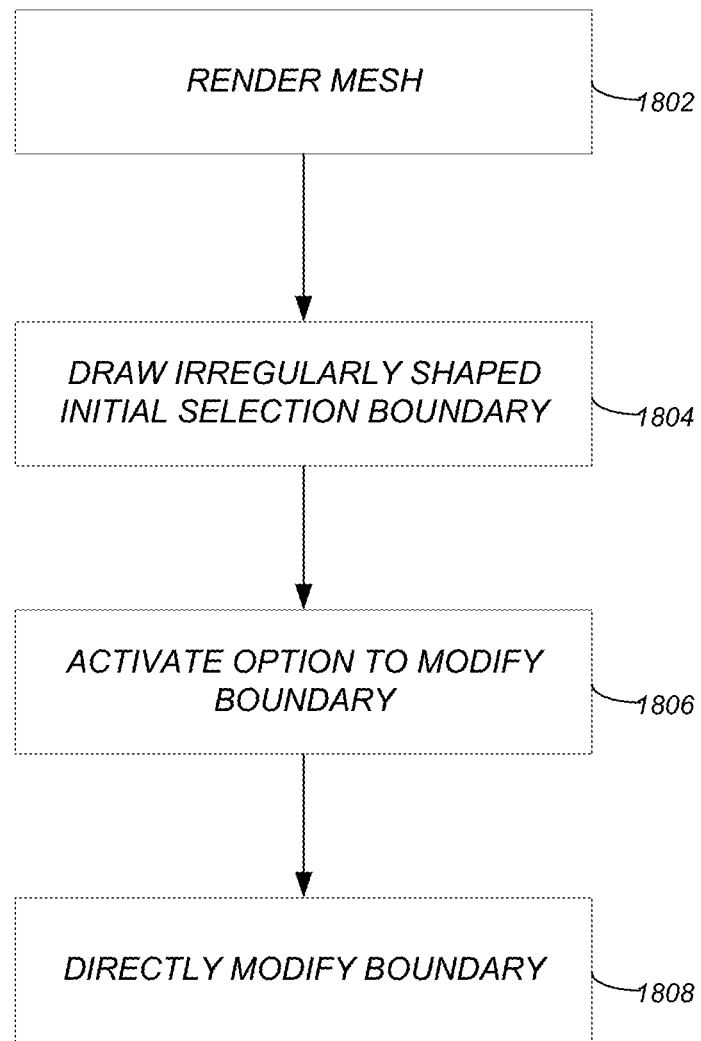
FIG. 18 illustrates the logical flow for adjusting a selection boundary in accordance with one or more embodiments of the invention.

FIG. 18 illustrates the logical flow for adjusting a selection boundary in accordance with one or more embodiments of the invention.

At step 1802, a mesh is rendered.

At step 1804, an irregularly shaped initial selection boundary is drawn on the mesh. The initial selection boundary selects an area of the mesh within the boundary.

At step 1806, an option to modify the initial selection boundary is activated.

At step 1808, the initial selection boundary is modified thereby creating a modified selection boundary. The directly modifying may be conducted by dragging a portion of the initial selection boundary to a new location (such that the initial selection boundary maintains connectivity during the dragging—i.e., the boundary is stretched). Alternatively, the directly modifying may be conducted by resizing the irregularly shaped initial selection boundary in all directions simultaneously.

Step 1808 may also include visually distinguishing the initially selected area with the modified selection area (e.g., dynamically in real-time as the boundary is modified). In this regard, the area of the mesh within the initial selection boundary that was selected prior to the directly modifying is displayed in a first visually distinguishable manner. Further, simultaneously with displaying the area of the mesh within the initial selection boundary in a first visually distinguishable manner, the area of the mesh within the modified selection boundary is displayed in a second visually distinguishable manner (e.g., a different color, brightness, transparency, etc.).

3D Elevation Slider

A 3D elevation slider shows interactive elevations, or slices of a particular 3D model (e.g., different floors of a building), which the user can adjust to set top/bottom heights. Each "slice" can be used to draw a top-view map, specific to the defined elevation. An example use case is that a user can quickly/easily create slices for each level of a building and immediately derive corresponding floor plans that show the layout for each floor.

Figure 19A:
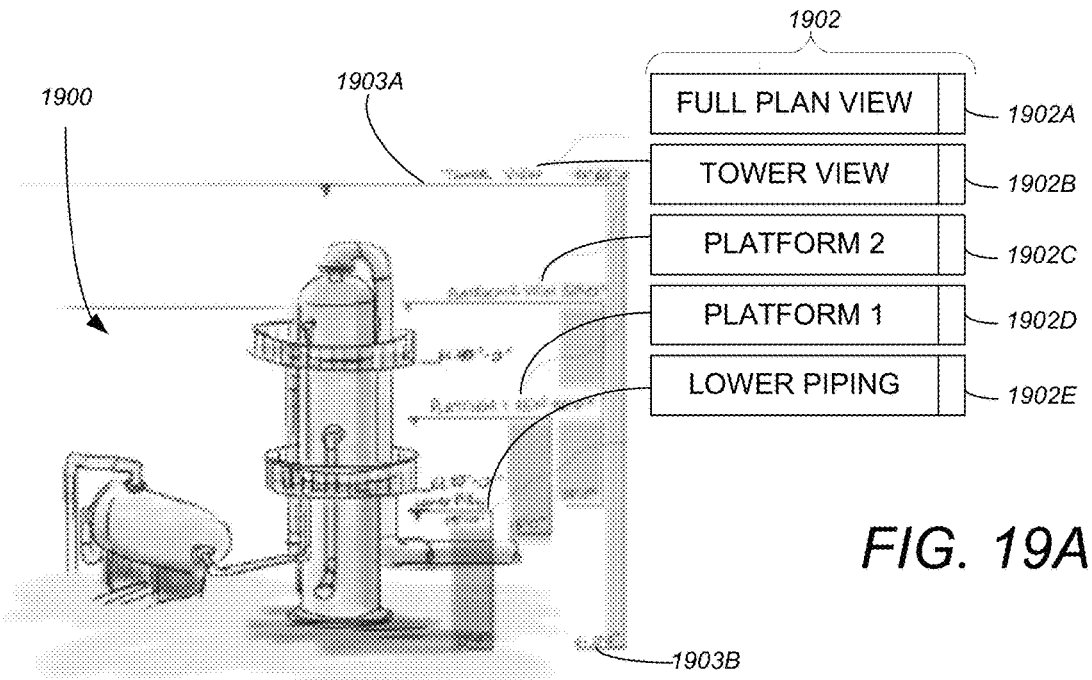
FIGS. 19A and 19B illustrate an elevation slider utilized in accordance with one or more embodiments of the invention.
Figure 19B:
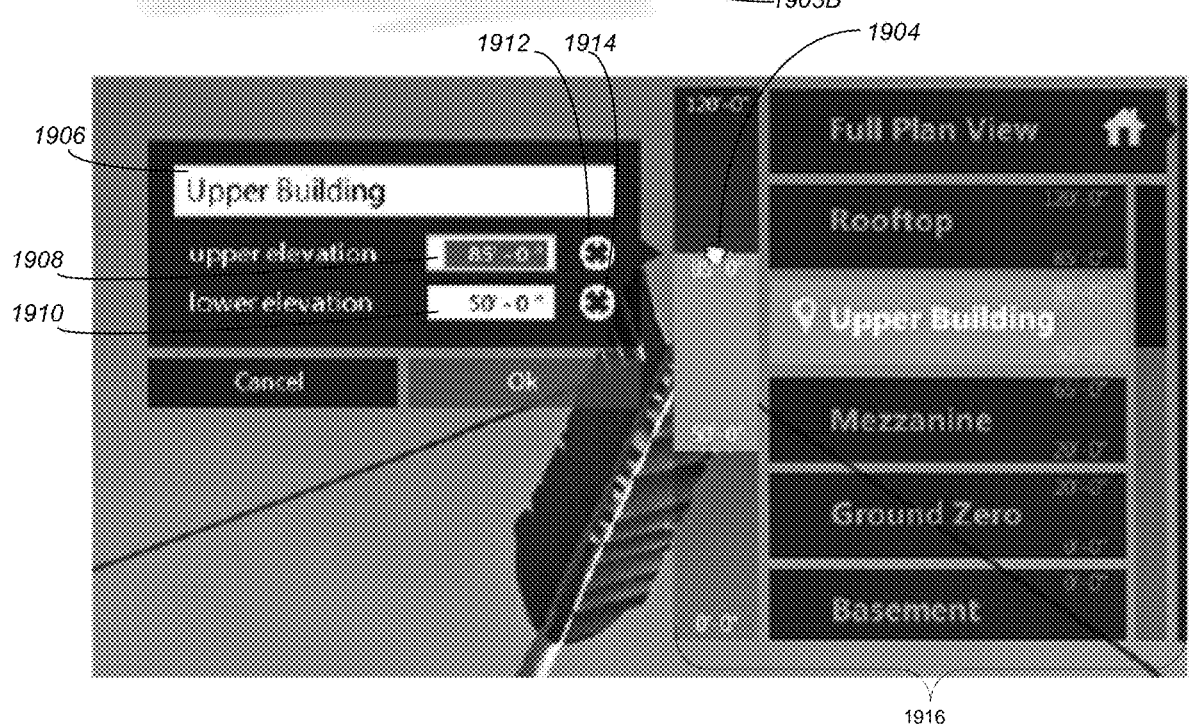

FIGS. 19A and 19B illustrate an elevation slider utilized in accordance with one or more embodiments of the invention. FIG. 19A illustrates different elevation slices that have been configured for the project/model 1900 illustrated. The stack of slices is shown at 1902. The full plan view 1902A covers the entire project with an upper elevation 1903A at a max Z and a lower elevation 1903B at a minimum Z. The other slices are a tower view 1902B, platform 2 1902C, platform 1 1902D, and lower piping 1902E.

FIG. 19B illustrates a 3D elevation slide tool that is used to set/configure the elevation slices. The user has the ability to drag sliders (e.g., using hand cursor 1904) to form the lower bounds and upper bounds to a specific elevation. The boundary can be moved to create an elevation slice/clipping/plane of the model 1900. The result of defining the elevation slice is a horizontal slice bounded by the upper and lower control settings/elevations. Subsequent to defining the elevation slice, the user still has the ability to fully navigate within 3D model 1900 (with the settings cutting the model at the specified elevations.

Referring again to FIG. 19B, the user can specify a name in area 1906 for a defined elevation slice. Once specified, the user can store the defined settings (e.g., name, upper elevation, and lower elevation) for later retrieval and use, as desired. The upper elevation and lower elevation settings may be entered by typing in numerical values in areas 1908 and 1910. Alternatively, the user may click on the cross-hairs 1912-1914 and select a location directly in the graphical view of the 3D model 1900. The elevation associated with the selected point is used as the elevation (and may populate fields 1908-1910 automatically). Area 1916 illustrates the list of defined elevation slices in order based on elevation. Upon selecting an elevation slice, the user can then drag the sliders using grip 1904 to adjust the elevations (wherein such adjustments will automatically populate/adjust the elevations settings 1908-1910).

In view of the above, embodiments of the invention enable the ability to define elevation slices by dragging a slider tool on a ramp to specify a range of elevation for clipping or display coloring. An exemplary use case includes a laser scan of an entire building where the user has the option to separate the $3^{rd}$ floor from other floors, with the ability to view/modify floor plans without interference from floors above and below. Of note is that the elevation tool is not tied to the camera but is tied to an elevation associated with the model. Further, once a slice is defined, such a defined slice can be isolated for viewing and/or manipulation.

Figure 20:
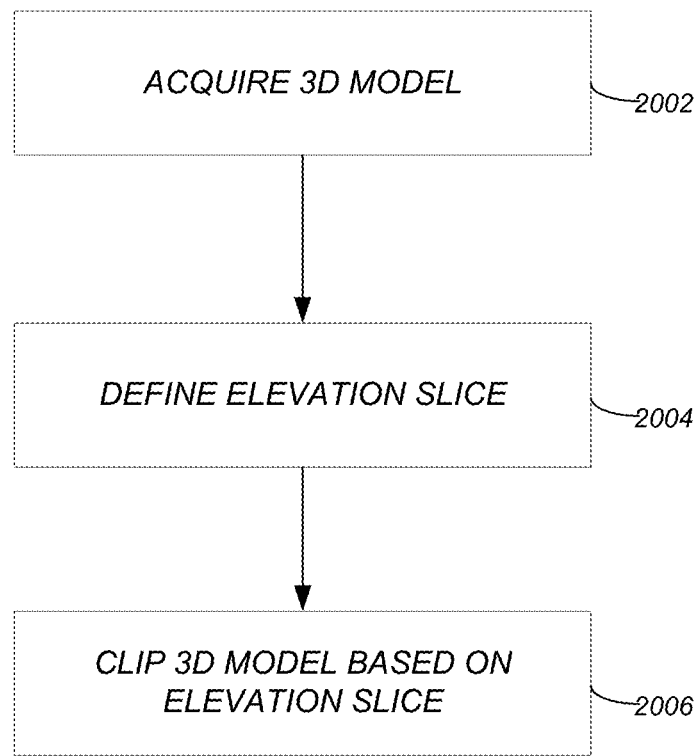
FIG. 20 illustrates the logical flow for defining an elevation slice of a 3D model in accordance with one or more embodiments of the invention.

FIG. 20 illustrates the logical flow for defining an elevation slice of a 3D model in accordance with one or more embodiments of the invention.

At step 2002, the 3D model is acquired. Such a 3D model has a maximum upper elevation and a minimum lower elevation.

At step 2004, an elevation slice for the 3D model is defined (i.e., within the range of the maximum upper elevation and minimum lower elevation). The slice is defined by dragging an upper elevation slider to an upper elevation, dragging a lower elevation slider to a lower elevation, and specifying a name for the elevation slice (e.g., $2^{nd}$ floor). Step 2004 may also include the saving of the define elevation slice.

At step 2006, the 3D model is clipped at the upper elevation and the lower elevation to isolate an area of the 3D model between the upper elevation and lower elevation. Thus, the elevation slice can be isolated for viewing and/or manipulation.

Steps 2004-2006 may be repeated thereby defining multiple elevation slices. Further, a slice tool may be rendered and provides the ability to simultaneously display a representation of the multiple elevation slices for the 3D model. The tool can then be used to modify a property of one of the multiple elevation slices. The tool modifies the property by selecting one of the multiple elevation slices, displaying the upper elevation and the lower elevation for the selected elevation slice, and modifying the upper elevation or the lower elevation for the selected elevation slice.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for viewing a three-dimensional (3D) model using two-dimensional (2D) images, comprising:
acquiring a set of two or more 2D images, wherein each of the two or more 2D images captures a different view of the 3D model;
identifying, for each of the two or more 2D images, a capture location within 3D space, wherein the capture location corresponds to where the 2D image was captured;
rendering a 3D model in a 3D viewport;
selecting a viewpoint in the 3D viewport;
in response to the selecting the viewpoint, identifying the 2D image that is nearest to the viewpoint; and
displaying, in a 2D viewport, the identified 2D image, wherein the 2D viewport is a different separate non-overlapping viewport from the 3D viewport;
selecting a different viewpoint in the 3D viewport;
in response to the selecting the different viewpoint in the 3D viewport, a different 2D image that is nearest to the different viewpoint is identified and displayed in the 2D viewport synchronously in real-time with displaying the 3D model in the 3D viewport;
wherein:
the 3D viewport is displayed simultaneously with the 2D viewport;
the 3D viewport comprises a first pane and the 2D viewport comprises a second pane;
the selecting in the 3D viewport affects a view displayed in the 2D viewport; and
a selecting of one of the two or more 2D images in the 2D viewport affects a view displayed in the 3D viewport.

2. The computer-implemented method of claim 1, wherein the selecting comprises:
rotating the 3D model in the 3D viewport;
determining where a 3D viewport camera is located; and
identifying the 3D viewport camera location as the viewpoint.

3. The computer-implemented method of claim 1, further comprising:
generating the 3D model based on the two or more 2D images;
while the 3D model is generating, simulating navigation of the 3D model by displaying the two or more 2D images.

4. The computer-implemented method of claim 1, further comprising:
linking the 2D viewport to the 3D viewport;
manipulating one or more of the 2D images in the 2D viewport; and
automatically updating the 3D model in the 3D viewport based on the linking and the manipulating.

5. The computer-implemented method of claim 1, further comprising:
linking the 2D viewport to the 3D viewport;
manipulating the 3D model in the 3D viewport; and
automatically updating the set of two or more 2D images in the 2D viewport based on the linking and the manipulating.

6. The computer-implemented method of claim 1, further comprising:
linking the 2D viewport to the 3D viewport;

performing a zoom operation in the 2D viewport or the 3D viewport;
based on the linking, performing a corresponding zoom operation in the 3D viewport or the 2D viewport respectively.

7. The computer-implemented method of claim 6, wherein the zoom operation and the corresponding zoom operation are performed in synchronization dynamically in real time.

8. The computer-implemented method of claim 1, wherein nearest is defined based on distance and angle.

9. The computer-implemented method of claim 1, further comprising:
determining positions of the two or more 2D images within 3D space;
generating a mapping for each of the two or more 2D images, wherein the mapping identifies which of the two or more 2D images to navigate to based upon a navigation operation from another one of the two or more 2D images;
receiving the navigation operation while the identified 2D image is displayed; and
rendering, based on the mapping and the navigation operation, another one of the two or more 2D images.

10. A system for viewing a three-dimensional (3D) model using two-dimensional (2D) images, comprising:
(a) a computer having a processor and a memory;
(b) a processor executing on the computer;
(c) the memory storing a set of instructions, wherein the set of instructions, when executed by the processor cause the processor to perform operations comprising:
(i) acquiring a set of two or more 2D images, wherein each of the two or more 2D images captures a different view of the 3D model;
(ii) identifying, for each of the two or more 2D images, a capture location within 3D space, wherein the capture location corresponds to where the 2D image was captured;
(iii) rendering a 3D model in a 3D viewport;
(iv) selecting a viewpoint in the 3D viewport;
(v) in response to the selecting the viewpoint, identifying the 2D image that is nearest to the viewpoint;
(vi) displaying, in a 2D viewport, the identified 2D image, wherein the 2D viewport is a different separate nonoverlapping viewport from the 3D viewport;
(vii) selecting a different viewpoint in the 3D viewport;
(viii) in response to the selecting the different viewpoint in the 3D viewport, a different 2D image that is nearest to the different viewpoint is identified and displayed in the 2D viewport synchronously in real-time with displaying the 3D model in the 3D viewport;
wherein:
the 3D viewport is displayed simultaneously with the 2D viewport;
the 3D viewport comprises a first pane and the 2D viewport comprises a second pane;
the selecting in the 3D viewport affects a view displayed in the 2D viewport; and
a selecting of one of the two or more 2D images in the 2D viewport affects a view displayed in the 3D viewport.

11. The computer-implemented system of claim 10, wherein the selecting comprises:
rotating the 3D model in the 3D viewport;
determining where a 3D viewport camera is located; and
identifying the 3D viewport camera location as the viewpoint.

12. The computer-implemented system of claim 10, wherein the operations further comprise:
generating the 3D model based on the two or more 2D images;
while the 3D model is generating, simulating navigation of the 3D model by displaying the two or more 2D images.

13. The computer-implemented system of claim 10, wherein the operations further comprise:
linking the 2D viewport to the 3D viewport;
manipulating one or more of the 2D images in the 2D viewport; and
automatically updating the 3D model in the 3D viewport based on the linking and the manipulating.

14. The computer-implemented system of claim 10, wherein the operations further comprise:
linking the 2D viewport to the 3D viewport;
manipulating the 3D model in the 3D viewport; and
automatically updating the set of two or more 2D images in the 2D viewport based on the linking and the manipulating.

15. The computer-implemented system of claim 10, wherein the operations further comprise:
linking the 2D viewport to the 3D viewport;
performing a zoom operation in the 2D viewport or the 3D viewport;
based on the linking, performing a corresponding zoom operation in the 3D viewport or the 2D viewport respectively.

16. The computer-implemented system of claim 15, wherein the zoom operation and the corresponding zoom operation are performed in synchronization dynamically in real time.

17. The computer-implemented system of claim 10, wherein nearest is defined based on distance and angle.

18. The computer-implemented system of claim 10, wherein the operations further comprise:
determining positions of the two or more 2D images within 3D space;
generating a mapping for each of the two or more 2D images, wherein the mapping identifies which of the two or more 2D images to navigate to based upon a navigation operation from another one of the two or more 2D images;
receiving the navigation operation while the identified 2D image is displayed; and
rendering, based on the mapping and the navigation operation, another one of the two or more 2D images.

* * * * *